United States Patent
Tremba et al.

(10) Patent No.: US 12,476,392 B2
(45) Date of Patent: *Nov. 18, 2025

(54) CONDUCTOR HAVING AN INNER CONDUCTOR ENGAGER

(71) Applicant: PPC BROADBAND, INC., East Syracuse, NY (US)

(72) Inventors: Timothy N. Tremba, Cayuta, NY (US); Harold J. Watkins, Chittenango, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 252 days.

This patent is subject to a terminal disclaimer.

(21) Appl. No.: 18/104,074

(22) Filed: Jan. 31, 2023

(65) Prior Publication Data

US 2023/0178907 A1    Jun. 8, 2023

Related U.S. Application Data

(63) Continuation of application No. 17/094,511, filed on Nov. 10, 2020, now Pat. No. 11,569,593, which is a continuation of application No. 15/786,456, filed on Oct. 17, 2017, now Pat. No. 10,833,433, which is a continuation of application No. 14/579,021, filed on Dec. 22, 2014, now Pat. No. 9,793,624.

(Continued)

(51) Int. Cl.
*H01R 9/05* (2006.01)
*H01R 13/52* (2006.01)

(52) U.S. Cl.
CPC ....... *H01R 9/0524* (2013.01); *H01R 13/5205* (2013.01)

(58) Field of Classification Search
None
See application file for complete search history.

(56) References Cited

U.S. PATENT DOCUMENTS

| 1,822,056 A | 9/1931 | Noble |
| 2,805,399 A | 9/1957 | Leeper |

(Continued)

FOREIGN PATENT DOCUMENTS

| CN | 101479892 | 7/2009 |
| DE | 3743636 | 7/1989 |

(Continued)

OTHER PUBLICATIONS

Search Report dated Mar. 18, 2015 in corresponding International Application No. PCT/US2014/071867, 2 pages.

(Continued)

*Primary Examiner* — Abdullah A Riyami
(74) *Attorney, Agent, or Firm* — MH2 TECHNOLOGY LAW GROUP LLP

(57) ABSTRACT

A connector includes: (i) an inner conductor engager comprising at least one tab being flexible to define an opening engager, (ii) a driver configured to drive the inner conductor engager to a desired position along the inner conductor, and (iii) a housing coupled to the inner conductor engager. The opening is configured to receive an inner conductor of a coaxial cable and extends through the entire inner conductor engager thus allowing the inner conductor to electrically connect to an interface port.

24 Claims, 23 Drawing Sheets

Related U.S. Application Data

(60) Provisional application No. 61/920,562, filed on Dec. 24, 2013.

(56) References Cited

U.S. PATENT DOCUMENTS

| | | | |
|---|---|---|---|
| 3,058,762 A | 10/1962 | Howe | |
| 3,264,602 A | 8/1966 | Schwartz | |
| 3,571,783 A | 3/1971 | Lusk | |
| 3,710,005 A | 1/1973 | French | |
| 3,744,007 A | 7/1973 | Horak | |
| 3,874,709 A * | 4/1975 | MacDonald | F16L 37/091 285/104 |
| 3,888,522 A * | 6/1975 | Moreiras | F16L 19/103 285/341 |
| 3,963,321 A * | 6/1976 | Burger | H01R 9/0503 439/584 |
| 3,970,355 A * | 7/1976 | Pitschi | H01R 24/40 439/578 |
| 3,980,325 A * | 9/1976 | Robertson | F16L 43/008 285/382.7 |
| 4,030,741 A * | 6/1977 | Fidrych | F16L 5/00 174/653 |
| 4,053,200 A | 10/1977 | Pugner | |
| 4,062,574 A | 12/1977 | Scholin | |
| 4,133,594 A | 1/1979 | Laverick et al. | |
| 4,146,254 A | 3/1979 | Turner et al. | |
| 4,243,290 A | 1/1981 | Williams | |
| 4,342,496 A | 8/1982 | Hutter et al. | |
| 4,515,991 A | 5/1985 | Hutchison | |
| 4,575,274 A | 3/1986 | Hayward | |
| 4,583,811 A | 4/1986 | McMills | |
| 4,639,068 A * | 1/1987 | McMills | H01R 9/05 403/11 |
| 4,696,532 A | 9/1987 | Mattis | |
| 4,717,355 A | 1/1988 | Mattis | |
| 4,739,126 A | 4/1988 | Gutter et al. | |
| 4,834,675 A | 5/1989 | Samchisen | |
| 5,007,861 A | 4/1991 | Stirling | |
| 5,011,432 A | 4/1991 | Sucht et al. | |
| 5,066,248 A | 11/1991 | Gaver, Jr. et al. | |
| 5,076,806 A * | 12/1991 | Hotea | H01R 13/506 439/752 |
| 5,160,179 A * | 11/1992 | Takagi | F16L 37/0915 285/317 |
| 5,284,449 A * | 2/1994 | Vaccaro | H01B 3/441 439/583 |
| 5,529,522 A * | 6/1996 | Huang | H01R 9/0527 439/441 |
| 5,609,501 A * | 3/1997 | McMills | H01R 9/053 439/433 |
| 5,676,651 A * | 10/1997 | Larson, Jr. | A61M 60/237 604/33 |
| 5,899,769 A * | 5/1999 | Konetschny | H01R 9/0521 439/578 |
| 5,942,730 A * | 8/1999 | Schwarz | H02G 15/04 174/84 R |
| 5,975,951 A | 11/1999 | Burris et al. | |
| 5,997,350 A * | 12/1999 | Burris | H01R 9/0521 439/585 |
| 6,056,326 A * | 5/2000 | Guest | F16L 37/0927 285/322 |
| 6,089,912 A * | 7/2000 | Tallis | H01R 24/542 439/583 |
| 6,298,843 B1 * | 10/2001 | Olsen | A47J 37/0763 126/30 |
| 6,331,123 B1 * | 12/2001 | Rodrigues | H01R 9/0524 439/584 |
| 6,403,884 B1 * | 6/2002 | Lange | H01R 13/622 174/653 |
| 6,648,683 B2 * | 11/2003 | Youtsey | H01R 9/0527 439/578 |
| 6,705,884 B1 | 3/2004 | McCarthy | |
| 6,776,657 B1 * | 8/2004 | Hung | H01R 13/5812 439/578 |
| 6,955,562 B1 * | 10/2005 | Henningsen | H01R 9/0521 439/578 |
| 7,018,235 B1 * | 3/2006 | Burris | H01R 9/0518 439/675 |
| 7,048,578 B2 * | 5/2006 | Rodrigues | H01R 9/0521 439/578 |
| 7,182,639 B2 * | 2/2007 | Burris | H01R 9/0518 439/675 |
| 7,189,114 B1 * | 3/2007 | Burris | H01R 4/20 439/578 |
| 7,207,839 B1 * | 4/2007 | Shelly | H01R 4/2495 439/585 |
| 7,288,002 B2 * | 10/2007 | Rodrigues | H01R 9/0521 439/441 |
| 7,331,820 B2 * | 2/2008 | Burris | H01R 9/05 439/275 |
| 7,335,058 B1 * | 2/2008 | Burris | H01R 13/506 439/353 |
| 7,507,907 B2 * | 3/2009 | Mueller | H02G 3/0666 174/78 |
| RE41,044 E | 12/2009 | Hung | |
| 7,635,283 B1 * | 12/2009 | Islam | H01R 24/40 439/583 |
| 7,648,164 B2 * | 1/2010 | Breed | B60N 2/02246 280/736 |
| 7,736,180 B1 * | 6/2010 | Paynter | H01R 4/5083 439/441 |
| 7,806,725 B1 | 10/2010 | Chen | |
| 7,824,214 B2 | 11/2010 | Paynter | |
| 7,883,363 B2 | 2/2011 | Montena | |
| 7,934,954 B1 | 5/2011 | Chawgo et al. | |
| 8,047,870 B2 * | 11/2011 | Clausen | H01R 24/564 439/578 |
| 8,062,063 B2 * | 11/2011 | Malloy | H01R 13/187 439/578 |
| 8,075,338 B1 | 12/2011 | Montena | |
| 8,113,878 B2 * | 2/2012 | Clausen | H01R 24/564 439/584 |
| 8,449,327 B2 | 5/2013 | Low et al. | |
| 8,454,385 B2 | 6/2013 | Chawgo et al. | |
| 8,460,031 B2 * | 6/2013 | Paynter | H01R 24/564 439/584 |
| 8,479,969 B2 * | 7/2013 | Shelton, IV | A61B 17/00234 227/19 |
| 8,573,465 B2 | 11/2013 | Shelton, IV | |
| 8,602,288 B2 | 12/2013 | Shelton, IV et al. | |
| 8,616,431 B2 * | 12/2013 | Timm | A61B 17/105 606/167 |
| 8,752,749 B2 * | 6/2014 | Moore | A61B 17/32 227/176.1 |
| 8,777,660 B2 * | 7/2014 | Chiarelli | H01R 13/59 439/752 |
| 8,783,541 B2 * | 7/2014 | Shelton, IV | A61B 17/0682 227/180.1 |
| 8,800,838 B2 * | 8/2014 | Shelton, IV | A61B 17/07207 227/176.1 |
| 8,820,605 B2 * | 9/2014 | Shelton, IV | A61B 34/74 227/176.1 |
| 8,888,526 B2 * | 11/2014 | Burris | H01R 24/40 439/578 |
| 9,287,659 B2 * | 3/2016 | Burris | H01R 24/40 |
| 9,407,016 B2 * | 8/2016 | Burris | H01R 4/304 |
| 9,455,523 B1 * | 9/2016 | Sundarakrishnamachari | H01R 13/62905 |
| 9,711,918 B2 * | 7/2017 | Watkins | H01R 24/38 |
| 9,793,624 B2 * | 10/2017 | Tremba | H01R 9/0524 |
| 9,793,660 B2 * | 10/2017 | Holland | H01R 24/46 |
| 10,027,040 B2 * | 7/2018 | Davidson, Jr. | H01R 9/0512 |
| 10,193,321 B2 * | 1/2019 | Proud | H01B 13/323 |
| 10,211,547 B2 * | 2/2019 | Burris | H01R 9/05 |
| 10,290,958 B2 * | 5/2019 | Burris | H01R 13/502 |
| 10,833,433 B2 * | 11/2020 | Tremba | H01R 9/0524 |
| 11,569,593 B2 * | 1/2023 | Tremba | H01R 9/0524 |
| 11,581,665 B2 * | 2/2023 | Eriksen | H01R 24/40 |

(56) References Cited

U.S. PATENT DOCUMENTS

| | | | | |
|---|---|---|---|---|
| 2004/0031144 A1* | 2/2004 | Holland | H02G 1/1285 | 29/758 |
| 2004/0142596 A1* | 7/2004 | Henningsen | H01R 9/0521 | 439/584 |
| 2005/0118865 A1* | 6/2005 | Henningsen | H01R 9/0524 | 439/578 |
| 2005/0186840 A1* | 8/2005 | Holliday | H01R 9/0524 | 439/578 |
| 2007/0149047 A1* | 6/2007 | Wild | H01R 24/566 | 439/578 |
| 2008/0003873 A1* | 1/2008 | Henningsen | H01R 24/40 | 439/578 |
| 2008/0045080 A1* | 2/2008 | Cook | H01R 9/0527 | 439/578 |
| 2009/0111323 A1* | 4/2009 | Burris | H01R 9/0524 | 439/607.41 |
| 2010/0233903 A1 | 9/2010 | Islam | | |
| 2010/0304606 A1 | 12/2010 | Montena | | |
| 2010/0311277 A1 | 12/2010 | Montena | | |
| 2011/0312211 A1 | 12/2011 | Natoli | | |
| 2012/0088404 A1* | 4/2012 | Wild | H01R 24/38 | 439/584 |
| 2012/0088407 A1 | 4/2012 | Natoli | | |
| 2012/0142207 A1* | 6/2012 | Duval | H02G 15/068 | 439/272 |
| 2012/0171894 A1* | 7/2012 | Malloy | H01R 13/187 | 439/578 |
| 2012/0196476 A1* | 8/2012 | Haberek | H01R 9/05 | 439/578 |
| 2012/0211274 A1 | 8/2012 | Drotleff et al. | | |
| 2012/0315788 A1* | 12/2012 | Montena | H01R 9/05 | 439/578 |
| 2013/0012062 A1* | 1/2013 | Nugent | H01R 43/20 | 439/578 |
| 2013/0040490 A1* | 2/2013 | Ariesen | H01R 9/0521 | 439/578 |
| 2013/0178096 A1* | 7/2013 | Matzen | H01R 9/05 | 439/578 |
| 2014/0106614 A1* | 4/2014 | Burris | H01R 9/0524 | 29/857 |
| 2014/0273579 A1* | 9/2014 | Madden | H01R 13/5205 | 439/275 |
| 2014/0322968 A1* | 10/2014 | Burris | H01R 9/05 | 439/578 |
| 2014/0322969 A1* | 10/2014 | Palinkas | H01R 9/0527 | 439/578 |
| 2014/0342605 A1* | 11/2014 | Burris | H01R 24/40 | 439/578 |
| 2015/0180142 A1* | 6/2015 | Tremba | H01R 9/0524 | 439/578 |
| 2015/0180183 A1* | 6/2015 | Watkins | H01R 13/6581 | 439/578 |
| 2015/0263449 A1* | 9/2015 | Watkins | H01R 13/5219 | 439/277 |
| 2017/0207555 A1* | 7/2017 | Eriksen | H01R 24/38 | |
| 2018/0040965 A1* | 2/2018 | Tremba | H01R 9/0524 | |
| 2018/0233865 A1* | 8/2018 | Eriksen | H01R 24/38 | |
| 2020/0227872 A1* | 7/2020 | Watkins | H01R 13/5825 | |

FOREIGN PATENT DOCUMENTS

| | | | | |
|---|---|---|---|---|
| EP | 0186339 | | 7/1986 | |
| EP | 0476056 | | 6/1995 | |
| FR | 1312525 | | 12/1962 | |
| GB | 2077053 | | 12/1981 | |
| WO | 9015454 | A1 | 12/1990 | |
| WO | WO-2015100229 | A1 * | 7/2015 | H01R 9/0524 |

OTHER PUBLICATIONS

Written Opinion dated Mar. 18, 2015 in corresponding International Application No. PCT/US2014/071867, 10 pages.
International Preliminary Report on Patentability dated Jun. 28, 2016 in corresponding International Application No. PCT/US2014/071867, 11 pages.
Brazilian Preliminary Office Action dated Mar. 31, 2020 in corresponding Brazilian Application No. BR112016015026-0, translated, 7 pages.
Chinese First Office Action dated Apr. 13, 2018 in corresponding Chinese Application No. 201480076170.6, translated, 6 pages.
Chinese Second Office Action dated Jan. 23, 2019 in corresponding Chinese Application No. 201480076170.6, translated, 12 pages.
Chinese Third Office Action dated Dec. 3, 2019 in corresponding Chinese Application No. 201480076170.6, translated, 14 pages.
European First Office Action dated Jul. 2, 2018 in corresponding European Application No. 14873501.2, 9 pages.
European Second Office Action dated Sep. 25, 2019 in corresponding European Application No. 14873501.2, 7 pages.
Extended European Search Report dated Jun. 14, 2017 in corresponding European Application No. 14873501.2, 8 pages.
Indian First Examination Report dated Jan. 24, 2020 in corresponding Indian Application No. 201617023797, 6 pages.

* cited by examiner

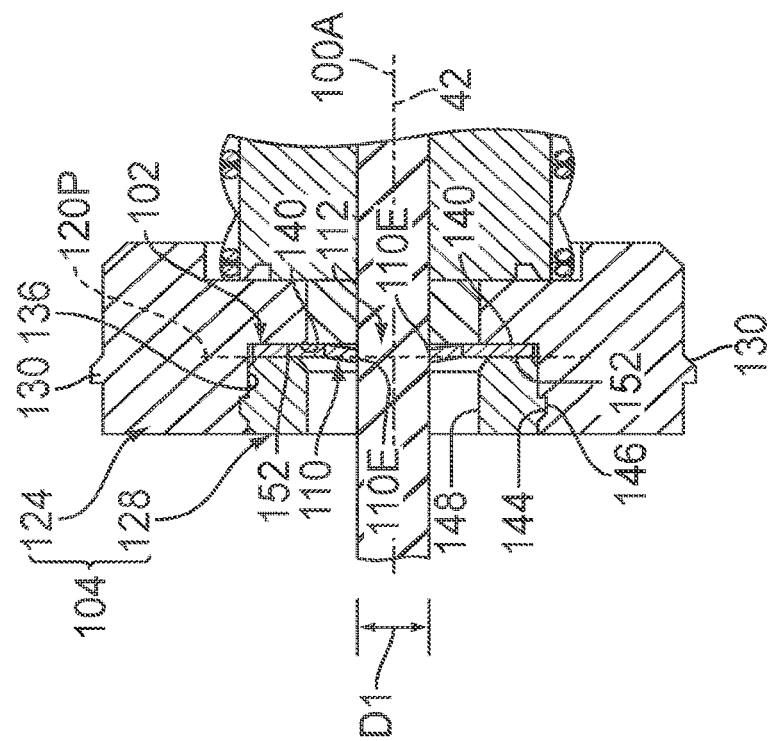
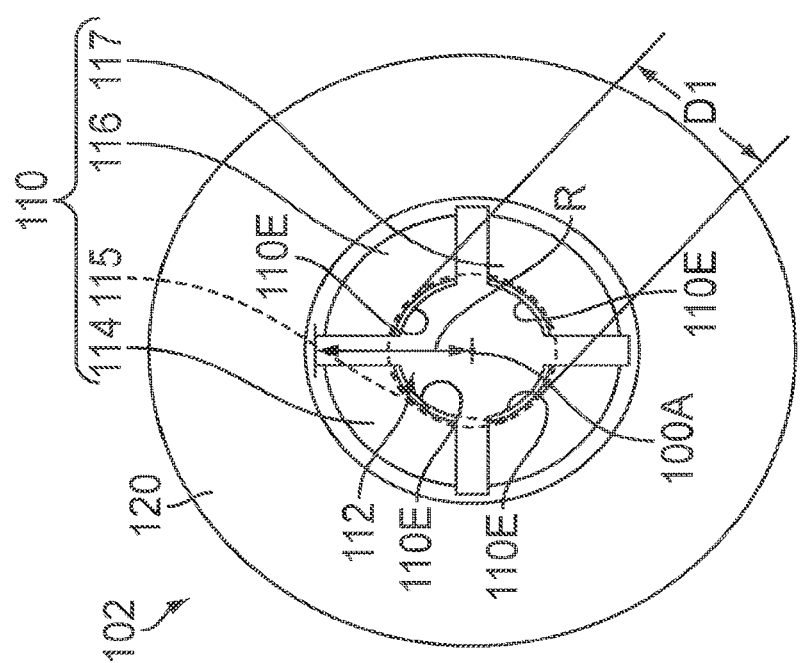
FIG. 11
FIG. 12

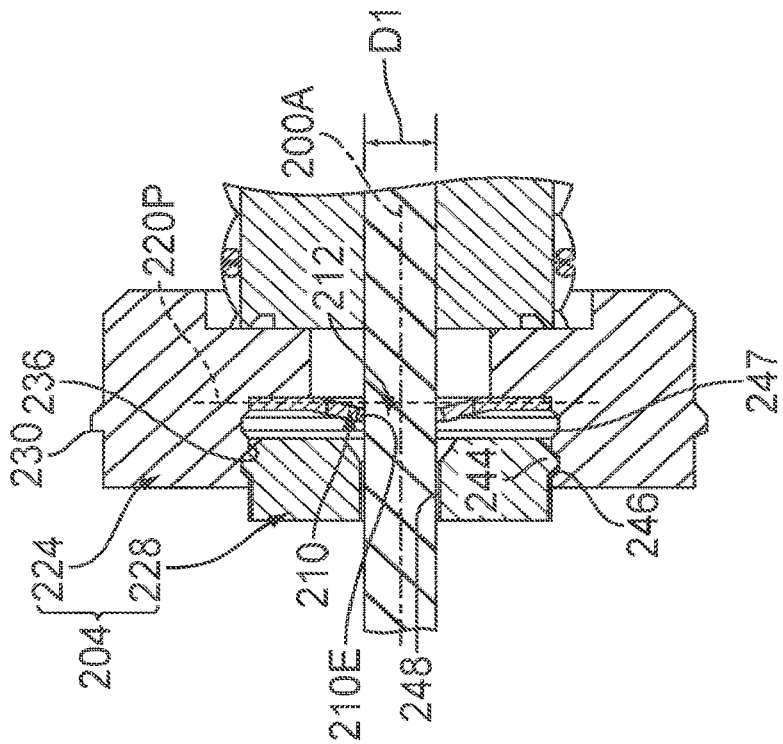
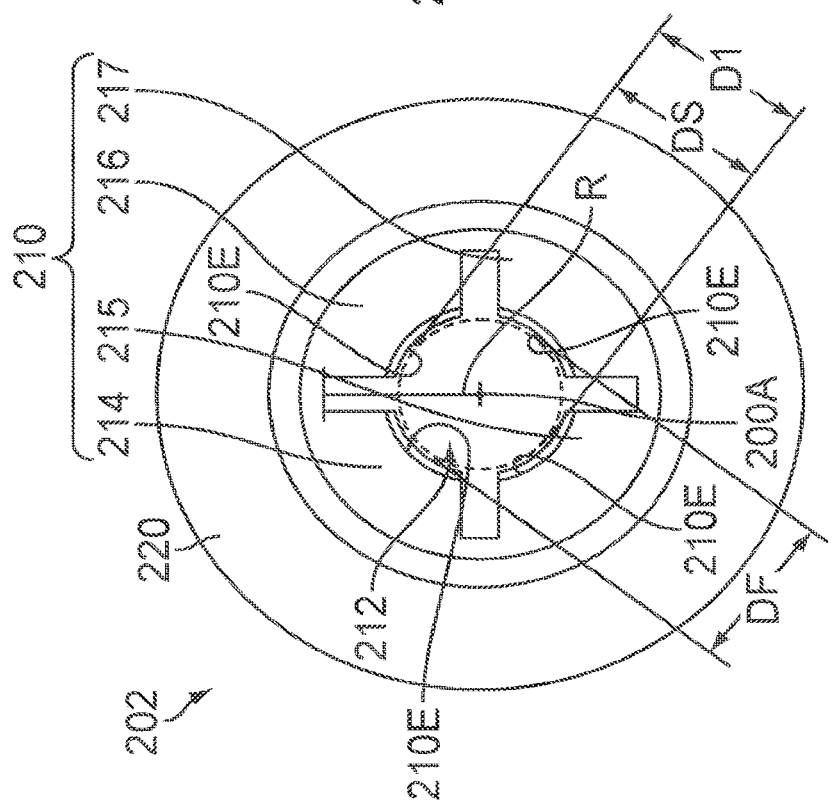
FIG. 18
FIG. 17

CONDUCTOR HAVING AN INNER CONDUCTOR ENGAGER

CROSS-REFERENCE TO RELATED APPLICATION

This application is a continuation of U.S. patent application Ser. No. 17/094,511, filed on Nov. 10, 2020, which is a continuation of U.S. patent application Ser. No. 15/786,456, filed Oct. 17, 2017, now U.S. Pat. No. 10,833,433, which is a continuation of U.S. patent application Ser. No. 14/579,021, filed Dec. 22, 2014, now U.S. Pat. No. 9,193,624, which claims the benefit of U.S. Provisional Patent Application No. 61/920,562, filed on Dec. 24, 2013. The entire contents of such applications are hereby incorporated by reference.

BACKGROUND OF THE INVENTION

Coaxial connectors are routinely coupled to coaxial cable to accommodate the need for variable lengths of cable in the field. That is, once a length of cable has been cut to size, the end of a coaxial cable is prepared and coupled to a cable connector. Once combined, the coaxial cable connector is ready to make the necessary electrical connection between an interface port and the coaxial cable to conduct RF energy/signals.

Typically, the connection therebetween relies upon axially-induced radial compression to produce the necessary friction loads/hoop stresses between a compliant outer jacket of the cable and a rigid inner post/outer body of the connector. Generally, the connection must carry at least about forty pounds (40 lbs) of axial load to be deemed sufficiently strong to meet the requirements of a "reliable" mechanical connection. However, as materials are lightened to remove weight and cost from both connector body and the coaxial cable, it is becoming increasingly more difficult/challenging to provide this threshold of axial retention. Additionally, other design criteria have given rise to even more rigid guidelines/standards to improve the level of axial retention. Moreover, there is an increasing need to simplify the number of steps required to effect such connections to minimize complexity and cost.

Therefore, there is a need to overcome, or otherwise lessen the effects of, the disadvantages and shortcomings described above.

BRIEF DESCRIPTION OF THE DRAWINGS

Features and advantages of the present disclosure are described in, and will be apparent from, the following Brief Description of the Drawings and Detailed Description.

FIG. 11 is an isolated plan view the inner conductor engager wherein the flexible tabs define an opening which is smaller than a cross-sectional dimension of an inner conductor of the cable.

FIG. 12 is an enlarged, broken-away, sectional view of the inner conductor engager and driver, shown in FIG. 9, disposed in combination with the inner conductor.

FIG. 17 is an isolated plan view the inner conductor engager wherein the deformable tabs define an opening which is larger than a cross-sectional dimension of an inner conductor of the cable.

FIG. 18 is an enlarged, broken-away, sectional view of the inner conductor engager, shown in FIG. 15, disposed in combination with the inner conductor.

SUMMARY OF THE INVENTION

A first embodiment includes an inner conductor engager, a driver and a housing. The inner conductor engager includes an opening which allows an inner conductor of a coaxial cable to extend through the engager and electrically connect to an interface port. The opening comprises at least one tab which is flexible and is configured to mechanically engage an outer peripheral surface of the inner conductor of the coaxial cable. The driver is configured to drive the inner conductor engager to a desired position along the inner conductor while the housing is coupled to the inner conductor engager and is configured to electrically connect to an outer conductor of the coaxial cable.

A second embodiment includes an inner conductor engager having an opening which is larger than the cross sectional diameter dimension of the inner conductor. The driver or ram plastically deforms the tabs into mechanical engagement with an outer peripheral surface of the inner conductor of the coaxial cable.

A third embodiment includes an inner conductor engager having a deformable member configured to engage a peripheral surface of the inner conductor of the coaxial cable. A compressor is displaced relative to the deformable member to close the deformable member against the peripheral surface to frictionally engage the inner conductor of the coaxial cable.

Other embodiments include a stacked arrangement of engagers to increase the retention force between the inner conductor and inner conductor engagers.

DETAILED DESCRIPTION

Network and Interfaces

Figure 1:
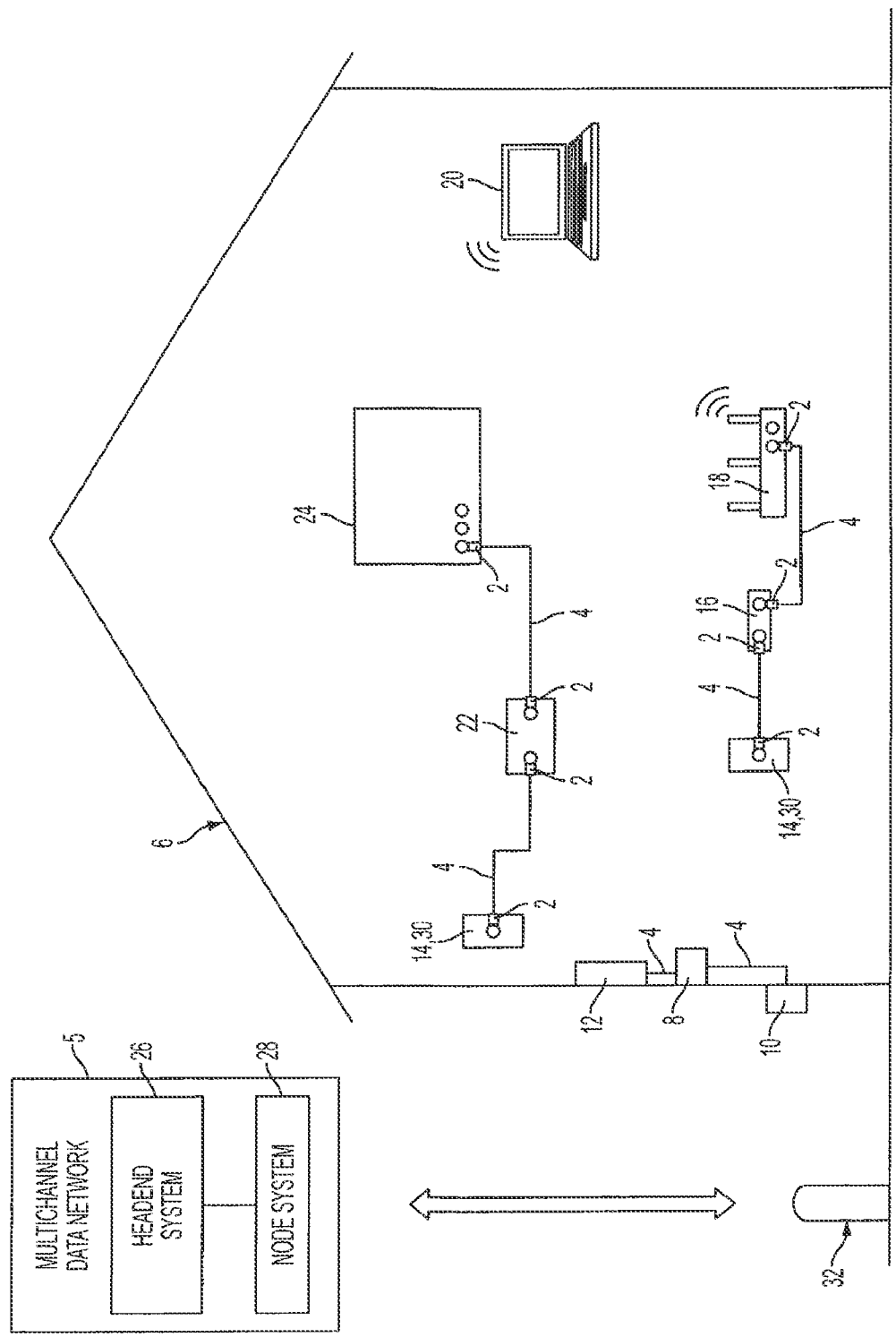
FIG. 1 is a schematic diagram illustrating an environment coupled to a multichannel data network.

Referring to FIG. 1, cable connectors 2 and 3 enable the exchange of data signals between a broadband network or multichannel data network 5, and various devices within a home, building, venue or other environment 6. For example, the environment's devices can include: (a) a point of entry ("PoE") filter 8 operatively coupled to an outdoor cable junction device 10; (b) one or more signal splitters within a service panel 12 which distributes the data service to interface ports 14 of various rooms or parts of the environment 6; (c) a modem 16 which modulates radio frequency ("RF") signals to generate digital signals to operate a wireless router 18; (d) an Internet accessible device, such as a mobile phone or computer 20, wirelessly coupled to the wireless router 18; and (e) a set-top unit 22 coupled to a television ("TV") 24. In one embodiment, the set-top unit 22, typically supplied by the data provider (e.g., the cable TV company), includes a TV tuner and a digital adapter for High Definition TV.

In one distribution method, the data service provider operates a headend facility or headend system 26 coupled to a plurality of optical node facilities or node systems, such as node system 28. The data service provider operates the node systems as well as the headend system 26. The headend system 26 multiplexes the TV channels, producing light beam pulses which travel through optical fiber trunklines. The optical fiber trunklines extend to optical node facilities in local communities, such as node system 28. The node system 28 translates the light pulse signals to RF electrical signals.

In one embodiment, a drop line coaxial cable or weather-protected or weatherized coaxial cable 29 is connected to the headend facility 26 or node facility 28 of the service provider. In the example shown, the weatherized coaxial cable 29 is routed to a standing structure, such as utility pole 31. A splitter or entry junction device 33 is mounted to, or hung from, the utility pole 31. In the illustrated example, the entry junction device 33 includes an input data port or input tap for receiving a hardline connector or pin-type connector 3. The entry junction box device 33 also includes a plurality of output data ports within its weatherized housing. It should be appreciated that such a junction device can include any suitable number of input data ports and output data ports.

The end of the weatherized coaxial cable 35 is attached to a hardline connector or pin-type connector 3, which has a protruding pin insertable into a female interface data port of the junction device 33. The ends of the weatherized coaxial cables 37 and 39 are each attached to one of the connectors 2 described below. In this way, the connectors 2 and 3 electrically couple the cables 35, 37 and 39 to the junction device 33.

In one embodiment, the pin-type connector 3 has a male shape which is insertable into the applicable female input tap or female input data port of the junction device 33. The two female output ports of the junction device 33 are female-shaped in that they define a central hole configured to receive, and connect to, the inner conductors of the connectors 2.

In one embodiment, each input tap or input data port of the entry junction device 33 has an internally threaded wall configured to be threadably engaged with one of the pin-type connectors 3. The network 5 is operable to distribute signals through the weatherized coaxial cable 35 to the junction device 33, and then through the pin-type connector 3. The junction device 33 splits the signals to the pin-type connectors 2, weatherized by an entry box enclosure, to transmit the signals through the cables 37 and 39, down to the distribution box 32 described below.

In another distribution method, the data service provider operates a series of satellites. The service provider installs an outdoor antenna or satellite dish at the environment 6. The data service provider connects a coaxial cable to the satellite dish. The coaxial cable distributes the RF signals or channels of data into the environment 6.

In one embodiment, the multichannel data network 5 includes a telecommunications, cable/satellite TV ("CATV") network operable to process and distribute different RF signals or channels of signals for a variety of services, including, but not limited to, TV, Internet and voice communication by phone. For TV service, each unique radio frequency or channel is associated with a different TV channel. The set-top unit 22 converts the radio frequencies to a digital format for delivery to the TV. Through the data network 5, the service provider can distribute a variety of types of data, including, but not limited to, TV programs including on-demand videos, Internet service including wireless or WiFi Internet service, voice data distributed through digital phone service or Voice Over Internet Protocol (VoIP) phone service, Internet Protocol TV ("IPTV") data streams, multimedia content, audio data, music, radio and other types of data.

In one embodiment, the multichannel data network 5 is operatively coupled to a multimedia home entertainment network serving the environment 6. In one example, such multimedia home entertainment network is the Multimedia over Coax Alliance ("MoCA") network. The MoCA network increases the freedom of access to the data network 5 at various rooms and locations within the environment 6. The MoCA network, in one embodiment, operates on cables 4 within the environment 6 at frequencies in the range 1125 MHz to 1675 MHz. MoCA compatible devices can form a private network inside the environment 6.

In one embodiment, the MoCA network includes a plurality of network-connected devices, including, but not limited to: (a) passive devices, such as the PoE filter 8, internal filters, diplexers, traps, line conditioners and signal splitters; and (b) active devices, such as amplifiers. The PoE filter 8 provides security against the unauthorized leakage of a user's signal or Network service to an unauthorized party or non-serviced environment. Other devices, such as line conditioners, are operable to adjust the incoming signals for better quality of service. For example, if the signal levels sent to the set-top box 22 do not meet designated flatness requirements, a line conditioner can adjust the signal level to meet such requirement.

In one embodiment, the modem 16 includes a monitoring module. The monitoring module continuously or periodically monitors the signals within the MoCA network. Based on this monitoring, the modem 16 can report data or information back to the headend system 26. Depending upon the embodiment, the reported information can relate to network problems, device problems, service usage or other events.

At different points in the network 5, cables 4 and 29 can be located indoors, outdoors, underground, within conduits, above ground mounted to poles, on the sides of buildings and within enclosures of various types and configurations. Cables 29 and 4 can also be mounted to, or installed within, mobile environments, such as land, air and sea vehicles.

As described above, the data service provider uses coaxial cables 29 and 4 to distribute the data to the environment 6. The environment 6 has an array of coaxial cables 4 at different locations. The connectors 2 are attachable to the coaxial cables 4. The cables 4, through use of the connectors 2, are connectable to various communication interfaces within the environment 6, such as the female interface ports 14 illustrated in FIGS. 1-2. In the examples shown, female interface ports 14 are incorporated into: (a) a signal splitter within an outdoor cable service or distribution box 32 which distributes data service to multiple homes or environments 6 close to each other; (b) a signal splitter within the outdoor cable junction box or cable junction device 10 which distributes the data service into the environment 6; (c) the set-top unit 22; (d) the TV 24; (e) wall-mounted jacks, such as a wall plate; and (f) the router 18.

Figure 2:
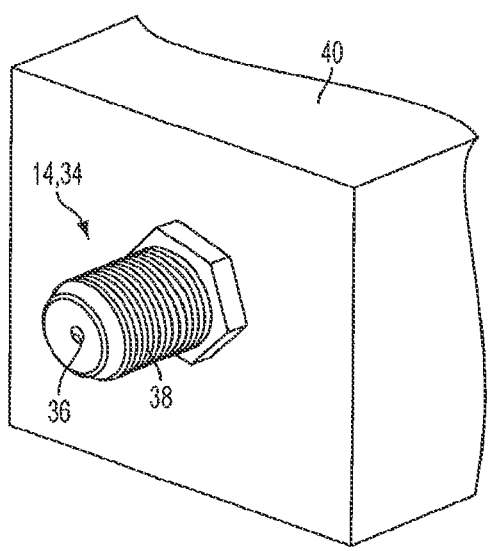
FIG. 2 is an isometric view of an interface port which is configured to be operatively coupled to the multichannel data network.
Figure 4:
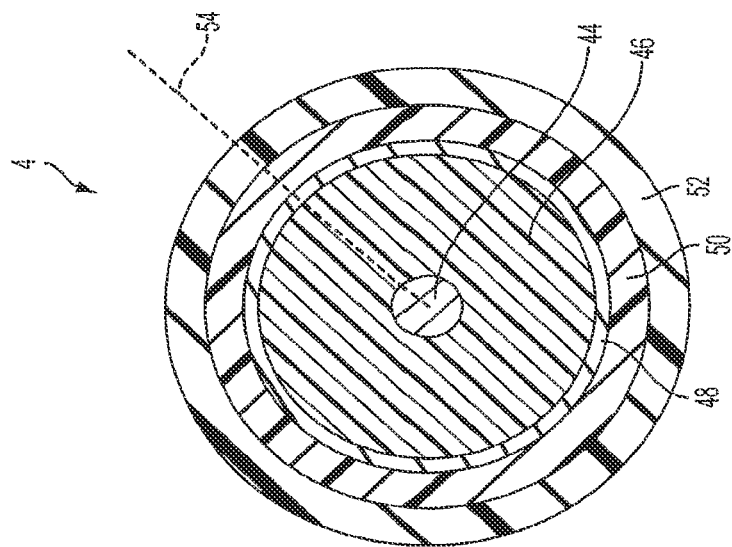
FIG. 4 is a cross-sectional view of the cable, taken substantially along line 4-4 of FIG. 3.

In one embodiment, each of the female interface ports 14 includes a stud or jack, such as the cylindrical stud 34 illustrated in FIG. 2. The stud 34 has: (a) an inner, cylindrical wall 36 defining a central hole configured to receive an electrical contact, wire, pin, conductor (not shown) positioned within the central hole; (b) a conductive, threaded outer surface 38; (c) a conical conductive region 41 having conductive contact sections 43 and 45; and (d) a dielectric or insulation material 47.

In one embodiment, stud 34 is shaped and sized to be compatible with the F-type coaxial connection standard. It should be understood that, depending upon the embodiment, stud 34 could have a smooth outer surface. The stud 34 can be operatively coupled to, or incorporated into, a device 40 which can include, for example, a cable splitter of a distribution box 32, outdoor cable junction box 10 or service panel 12; a set-top unit 22; a TV 24; a wall plate; a modem 16; a router 18; or the junction device 33.

During installation, the installer couples a cable 4 to an interface port 14 by screwing or pushing the connector 2 onto the female interface port 34. Once installed, the connector 2 receives the female interface port 34. The connector 2 establishes an electrical connection between the cable 4 and the electrical contact of the female interface port 34.

After installation, the connectors 2 often undergo various forces. For example, there may be tension in the cable 4 as it stretches from one device 40 to another device 40, imposing a steady, tensile load on the connector 2. A user might occasionally move, pull or push on a cable 4 from time to time, causing forces on the connector 2. Alternatively, a user might swivel or shift the position of a TV 24, causing bending loads on the connector 2. As described below, the connector 2 is structured to maintain a suitable level of electrical connectivity despite such forces.

Cable

Referring to FIGS. 3-6, the coaxial cable 4 extends along a cable axis or a longitudinal axis 42. In one embodiment, the cable 4 includes: (a) an elongated center conductor or inner conductor 44; (b) an elongated insulator 46 coaxially surrounding the inner conductor 44; (c) an elongated, conductive foil layer 48 coaxially surrounding the insulator 46; (d) an elongated outer conductor 50 coaxially surrounding the foil layer 48; and (e) an elongated sheath, sleeve or jacket 52 coaxially surrounding the outer conductor 50.

The inner conductor 44 is operable to carry data signals to and from the data network 5. Depending upon the embodiment, the inner conductor 44 can be a strand, a solid wire or a hollow, tubular wire. The inner conductor 44 is, in one embodiment, constructed of a conductive material suitable for data transmission, such as a metal or alloy including copper, including, but not limited to, copper-clad aluminum ("CCA"), copper-clad steel ("CCS") or silver-coated copper-clad steel ("SCCCS").

The insulator 46, in one embodiment, is a dielectric having a tubular shape. In one embodiment, the insulator 46 is radially compressible along a radius or radial line 54, and the insulator 46 is axially flexible along the longitudinal axis 42. Depending upon the embodiment, the insulator 46 can be a suitable polymer, such as polyethylene ("PE") or a fluoropolymer, in solid or foam form.

Figure 3:
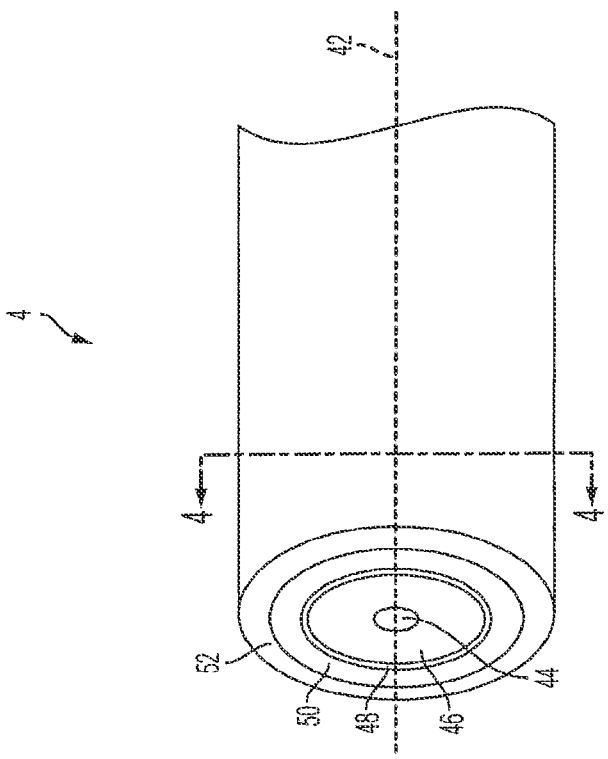
FIG. 3 is a broken-away isometric view of a cable which is configured to be operatively coupled to the multichannel data network.

In the embodiment illustrated in FIG. 3, the outer conductor 50 includes a conductive RF shield or electromagnetic radiation shield. In such embodiment, the outer conductor 50 includes a conductive screen, mesh or braid or otherwise has a perforated configuration defining a matrix, grid or array of openings. In one such embodiment, the braided outer conductor 50 has an aluminum material or a suitable combination of aluminum and polyester. Depending upon the embodiment, cable 4 can include multiple, overlapping layers of braided outer conductors 50, such as a dual-shield configuration, tri-shield configuration or quad-shield configuration.

In one embodiment, as described below, the connector 2 electrically grounds the outer conductor 50 of the coaxial cable 4. When the inner conductor 44 and external electronic devices generate magnetic fields, the grounded outer conductor 50 sends the excess charges to ground. In this way, the outer conductor 50 cancels all, substantially all or a suitable amount of the potentially interfering magnetic fields. Therefore, there is less, or an insignificant, disruption of the data signals running through inner conductor 44. Also, there or an insignificant, disruption of the operation of external electronic devices near the cable 4.

In one such embodiment, the cable 4 has one or more electrical grounding paths. One grounding path extends from the outer conductor 50 to the cable connector's conductive post, and then from the connector's conductive post to the interface port 14. Depending upon the embodiment, an additional or alternative grounding path can extend from the outer conductor 50 to the cable connector's conductive body, then from the connector's conductive body to the connector's conductive nut or coupler, and then from the connector's conductive coupler to the interface port 14.

The conductive foil layer 48, in one embodiment, is an additional, tubular conductor which provides additional shielding of the magnetic fields. In one embodiment, the foil layer 48 includes a flexible foil tape or laminate adhered to the insulator 46, assuming the tubular shape of the insulator 46. The combination of the foil layer 48 and the outer conductor 50 can suitably block undesirable radiation or signal noise from leaving the cable 4. Such combination can also suitably block undesirable radiation or signal noise from entering the cable 4. This can result in an additional decrease in disruption of data communications through the cable 4 as well as an additional decrease in interference with external devices, such as nearby cables and components of other operating electronic devices.

In one embodiment, the jacket 52 has a protective characteristic, guarding the cable's internal components from damage. The jacket 52 also has an electrical insulation characteristic. In one embodiment, the jacket 52 is compressible along the radial line 54 and is flexible along the longitudinal axis 42. The jacket 52 is constructed of a suitable, flexible material such as polyvinyl chloride (PVC) or rubber. In one embodiment, the jacket 52 has a lead-free formulation including black-colored PVC and a sunlight resistant additive or sunlight resistant chemical structure.

Figure 5:
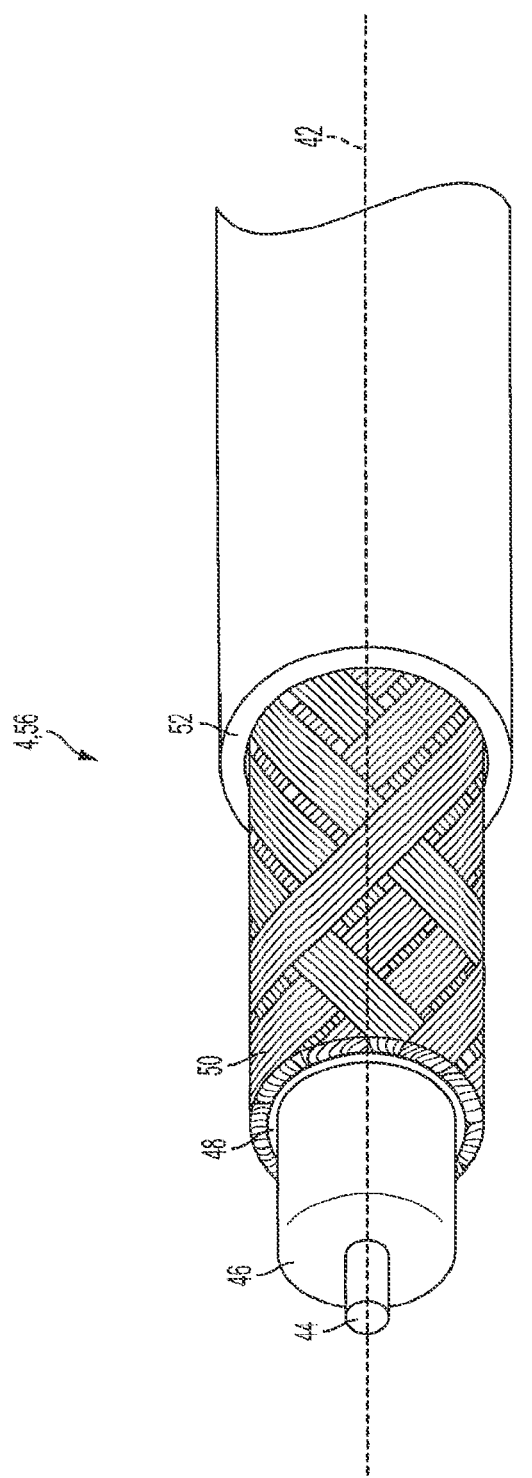
FIG. 5 is a broken-away isometric view of a cable which is configured to be operatively coupled to the multichannel data network, illustrating a three-stepped configuration of a prepared end of the cable.
Figure 6:
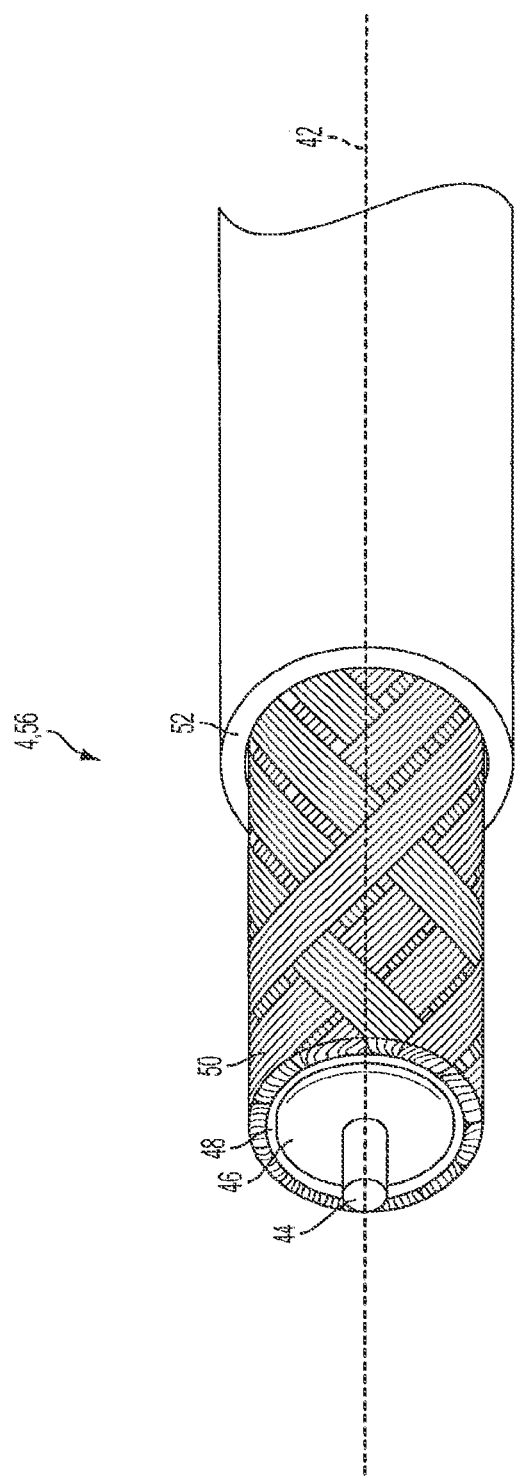
FIG. 6 is a broken-away isometric view of a cable which is configured to be operatively coupled to the multichannel data network, illustrating a two-stepped configuration of a prepared end of the cable.

Referring to FIGS. 5-6, in one embodiment an installer or preparer prepares a terminal end 56 of the cable 4 so that it can be mechanically connected to the connector 2. To do so, the preparer removes or strips away differently sized portions of the jacket 52, outer conductor 50 foil 48 and insulator 46 so as to expose the side walls of the jacket 52, outer conductor 50, foil layer 48 and insulator 46 in a stepped or staggered fashion. In the example shown in FIG. 5, the prepared end 56 has a three step-shaped configuration. In the example shown in FIG. 6, the prepared end 58 has a two step-shaped configuration. The preparer can use cable preparation pliers or a cable stripping tool to remove such portions of the cable 4. At this point, the cable 4 is ready to be connected to the connector 2.

Figure 7:
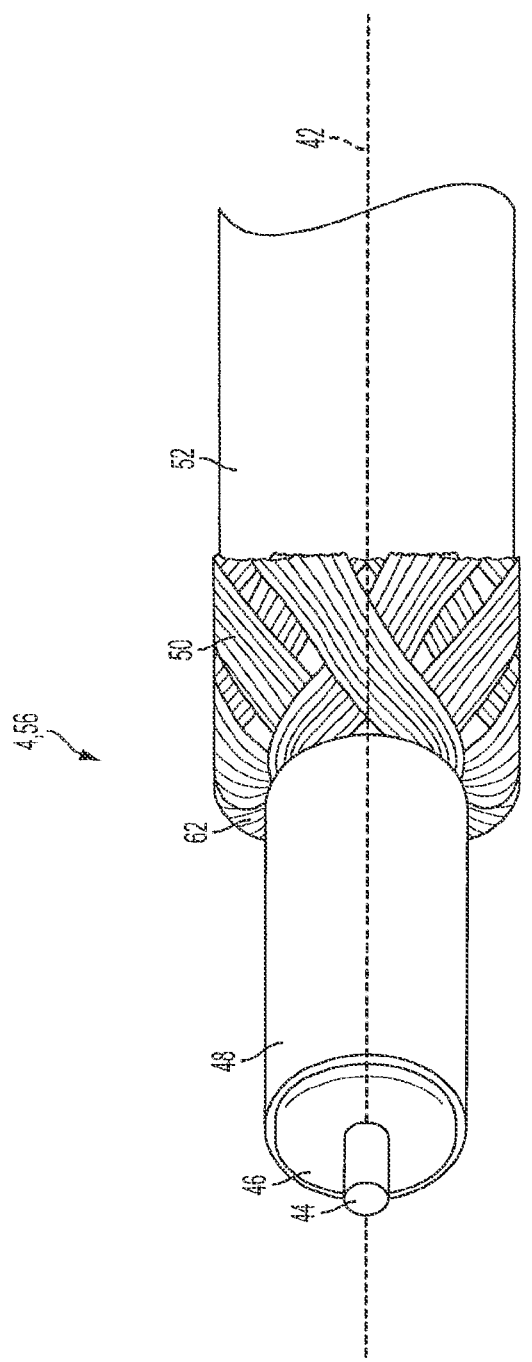
FIG. 7 is a broken-away isometric view a cable which is configured to be operatively coupled to the multichannel data network, illustrating the folded-back, braided outer conductor of a prepared end of the cable.

In one embodiment illustrated in FIG. 7, the installer or preparer performs a folding process to prepare the cable 4 for connection to connector 2. In the example illustrated, the preparer folds the braided outer conductor 50 backward onto the jacket 52. As a result, the folded section 60 is oriented inside out. The bend or fold 62 is adjacent to the foil layer 48 as shown. Certain embodiments of the connector 2 include a tubular post. In such embodiments, this folding process can facilitate the insertion of such post in between the braided outer conductor 50 and the foil layer 48.

Depending upon the embodiment, the components of the cable 4 can be constructed of various materials which have some degree of elasticity or flexibility. The elasticity enables the cable 4 to flex or bend in accordance with broadband communications standards, installation methods or installation equipment. Also, the radial thicknesses of the cable 4, the inner conductor 44, the insulator 46, the conductive foil layer 48, the outer conductor 50 and the jacket 52 can vary based upon parameters corresponding to broadband communication standards or installation equipment.

Figure 8:
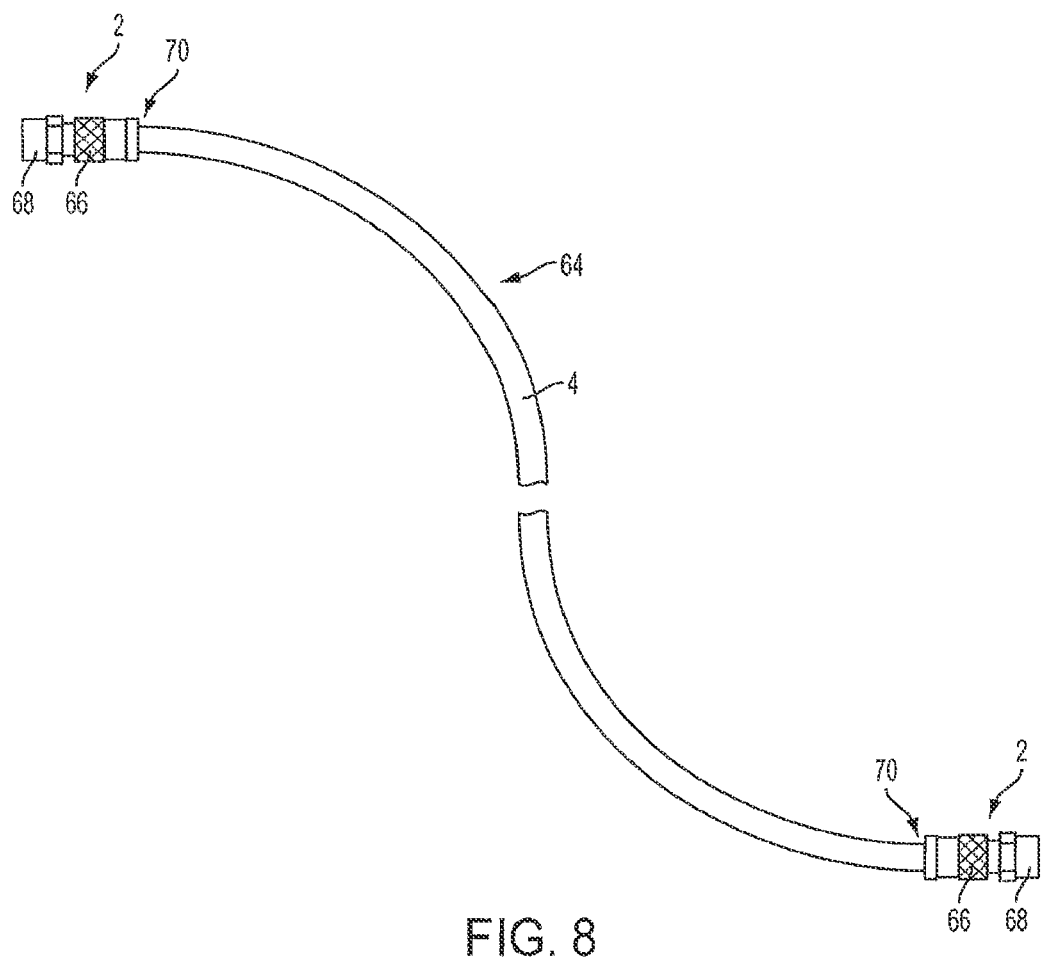
FIG. 8 is a top view of a cable jumper or cable assembly which is configured to be operatively coupled to the multichannel data network.

In one embodiment illustrated in FIG. 8, a cable jumper or cable assembly 64 includes a combination of the connector 2 and the cable 4 attached to the connector 2. In this embodiment, the connector 2 includes: (a) a connector body or connector housing 66; and (b) a fastener or coupler 68, such as a threaded nut, which is rotatably coupled to the connector housing 66. The cable assembly 64 has, in one embodiment, connectors 2 on both of its ends 70. Preassembled cable jumpers or cable assemblies 64 can facilitate the installation of cables 4 for various purposes.

In one embodiment the weatherized coaxial cable 29, illustrated in FIG. 1, has the same structure, configuration and components as coaxial cable 4 except that the weatherized coaxial cable 29 includes additional weather protective and durability enhancement characteristics. These characteristics enable the weatherized coaxial cable 29 to withstand greater forces and degradation factors caused by outdoor exposure to weather.

Connector

Referring to FIGS. 9-12, an embodiment of a cable connector 2, according to the present disclosure, includes a cable connector 100. The connector 100, shown in an exploded view, comprises an inner conductor engager 102, a driver 104, and a body or housing 106. In the described embodiment, the inner conductor engager 102, driver 104, and housing 106 co-axially align with each other and with the longitudinal axis 42 of the cable 4.

As illustrated in FIG. 11, the inner conductor engager 102 includes at least one projection, finger or flexible tab 110 defining an opening 112. In the illustrated embodiment, the inner conductor engager 102 includes a plurality of tabs 114, 115, 116 and 117, each having an arcuate-shaped edge 110E. In the described embodiment, each of the tabs 114-117 is configured to bend or flex such that the opening 112 is variable in size depending upon the direction of flexure.

The tabs 114-117 project inwardly from a disc-shaped outer ring 120 toward a central axis 100A normal to a plane 120P (see FIG. 12) defined by the ring 120. Additionally, the tabs 114-117 are biased out-of-plane, i.e., in a direction out of the plane 120P of the outer ring 120. Flexure of the tabs 114-117 away from the outer ring 120 increases the opening 112 while flexure of the tabs 114-117 toward the ring 120 diminishes the size of the opening 112. As will be described in greater detail below when discussing the function of the inner conductor engager 102, the opening 112 defined by the tabs 114-117 is initially smaller than a cross-sectional, or diameter, dimension D1 defined by the inner conductor 44. In this embodiment, flexure of the tabs 114-117 allows the inner conductor engager 102 to slide over and receive the inner conductor 44 of the cable 4 through the opening 112.

The inner conductor engager 102 may comprise a flexible metal such that flexible tabs 114-117 and outer ring 120 can be fabricated or stamped from a relatively thin disc of metallic material. In the described embodiment, the inner conductor engager 102 comprises a thin, stainless steel, aluminum, or steel/aluminum alloy having a thickness of approximately 0.05 mm to approximately 0.25 mm. The spring stiffness of the flexible tabs 114-117 is approximately 0.04 N/m to about 50.0 N/m. Depending upon the embodiment, the tabs 114-117 can have a resilient or elastic characteristic. In one such embodiment, the tabs 114-117 are constructed of a non-conductive, polymer or plastic material.

The driver 104 includes a housing coupler 124 and an adaptor 128. The housing coupler 124 includes a circumferential ring 130 (best seen in FIG. 9) for engaging a ring-shaped groove 132 (see FIG. 10) formed within an internal bore 134 of the housing 106. Furthermore, the housing coupler 124 defines a recess or aperture 136 for receiving the adaptor 128 and a shoulder 140 for engaging an inboard end of the inner conductor engager 102. The mounting arrangement between the housing coupler 124 and the adaptor 128 includes a similar ring and groove arrangement. More specifically, the adaptor 128 includes a circumferential ring 144 which projects outwardly and mounts within a ring-shaped groove 146 (best shown in FIG. 9) of the housing coupler 124. As will be discussed in greater detail below, this mounting arrangement facilitates commonality of component parts and ease of assembly/disassembly.

While the described embodiment includes a driver 104 having multiple segments, i.e., a housing coupler 124 and an adaptor 128, it should be appreciated that the housing coupler 124 and adaptor 128 may be integrated as a unitary structure. The multi-segment driver 104 of the present disclosure, however, has the advantage of providing a degree of modularity, for example, the ability to interchangeably integrate one type/size of driver 104 with a different type/size of inner conductor engager 102, or a larger smaller housing 106.

In the described embodiment, the driver 104 is coaxial with the inner conductor engager 102, centers the housing 106 around the inner conductor 44, and facilitates flexure of the tabs 114-117. More specifically, the aperture 148 of the driver 104 is larger than a cross-sectional dimension D1 of the inner conductor 44 and, in the described embodiment, measures a sum equal to the diameter dimension D1 of the inner conductor 44 and at least twice the radial distance R of a flexible tab 110. Accordingly, the driver 104 defines an aperture 148 which provides a void region adjacent the flexible tabs 114-117. That is, the void region allows the tabs 114-117 to flex freely in a direction normal to the plane of the outer ring 120. Alternatively, the driver 104 includes an abutment surface for engaging the inner conductor engager 102 at a radial position outboard of the tabs 114-117. Therefore, the driver 104 is operative to urge the inner conductor engager 102 to a desired axial position along the longitudinal axis 42 of the inner conductor 44. The import of this mounting arrangement and the function of the driver 104 will become apparent in the subsequent paragraphs.

Inasmuch as the driver 104 has the potential to electrically interconnect the first and second conductors 44, 50, the driver 104 comprises a dielectric material to prevent or inhibit the flow of current and/or an electrical short between the conductors 44, 50. In the described embodiment, the housing coupler 124 and adaptor 128 are fabricated from a TPX® polymethypentene or other polymer material, e.g., polyethylene, polyimide, polyurethane materials, having a dielectric constant (sometimes referred to as the relative permittivity) of less than about 2.12 kHz (TPX® is a registered Trademark of Mitsui Chemicals America, Inc located in Rye Brook, New York, USA).

The inner conductor engager 102, whether manufactured from a metallic or non-metallic material, is sufficiently thin to minimally impact the electrical properties of the connector 100. Additionally, the multi-element or segment driver 104 is fabricated from low dielectric materials to also have a minimal impact on the electrical properties of the connector 100. Accordingly, the engager 102 and driver 104 do not significantly impact the impedance of the connector 100 and, consequently, facilitate greater design flexibility for the connector 100 in terms of its electrical properties.

Figure 9:
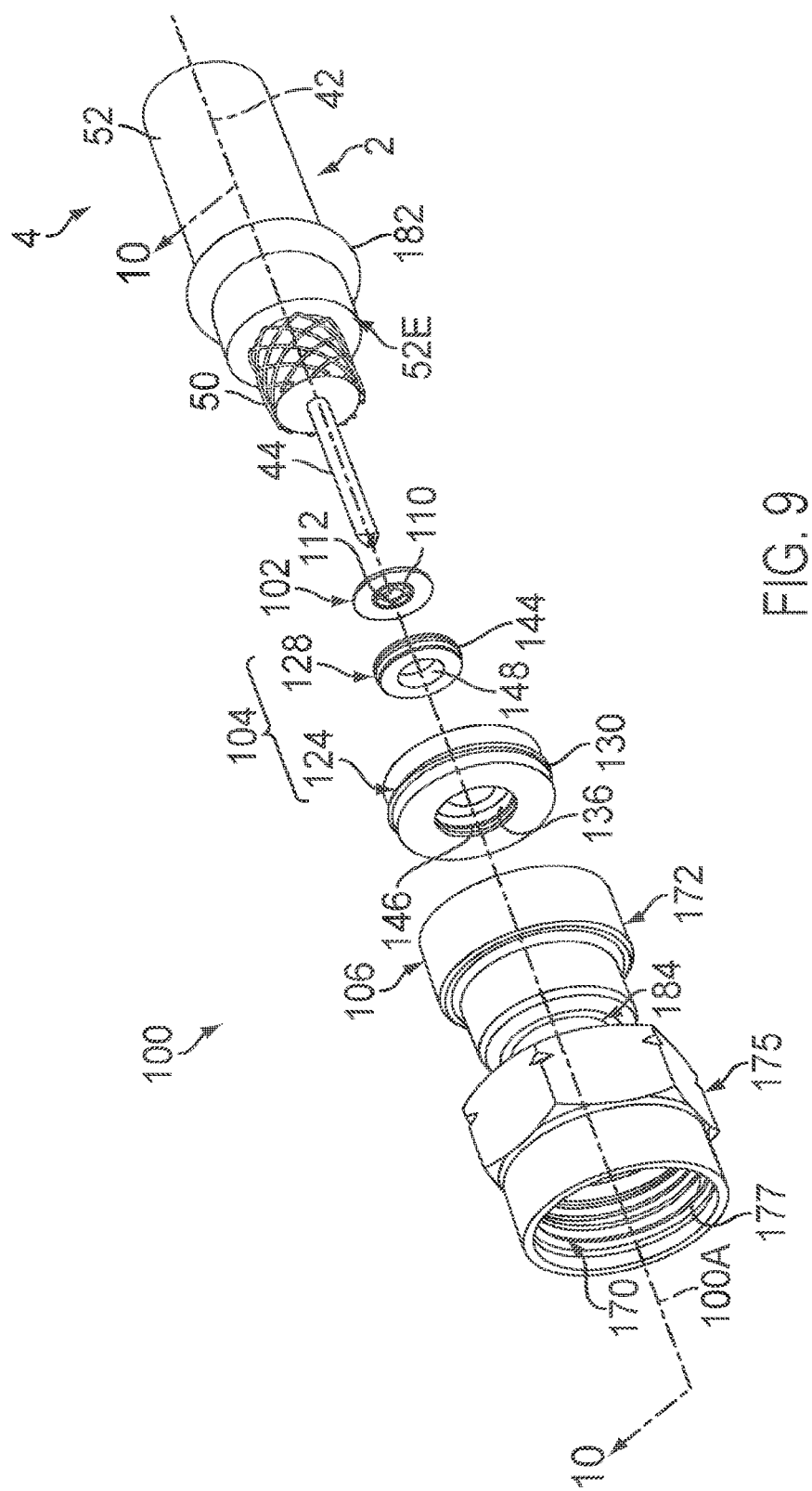
FIG. 9 is an exploded isometric view of a cable connector according to one embodiment of the disclosure wherein an inner conductor engager having a plurality of flexible tabs couples a connector housing to a cable.

The body or housing 106 defines a central bore 170 which circumscribes and receives the driver 104. More specifically, the housing 106 includes inboard and outboard end portions 172 and 174, respectively, wherein the inboard end portion 162 extends over and circumscribes a terminal end 52E of the jacket 52. The outboard end portion 174 includes an integral nut member or other suitable interface port coupling member 175. As illustrated in FIG. 9, the port coupling member 175 includes a cylindrical, inner wall having threads 177. Though the illustrated embodiment includes a port coupling member 175 having internal threaded for engaging a female port, it should be appreciated that the other embodiments may include a coupling member having external threads for engaging a male port.

In the described embodiment, the inboard end portion 172 includes a seal, or O-ring, groove 180 formed in an internal wall of the housing 106. A seal, such an O-ring 182, is disposed in the O-ring groove 180 between the housing 106 and the jacket 52.

Figure 10:
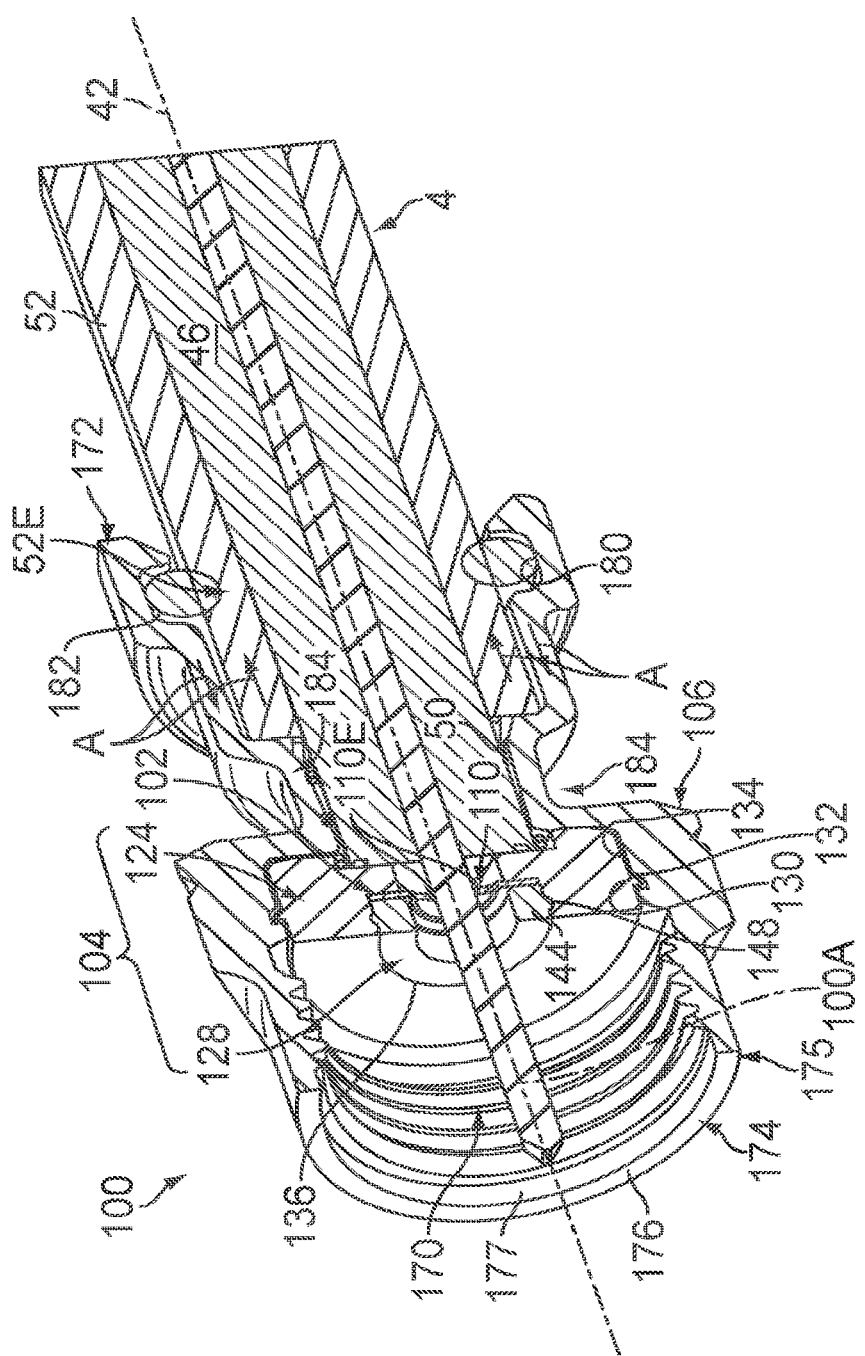
FIG. 10 is an assembled cross-sectional view of the cable connector taken substantially along line 10-10 of FIG. 9.

In FIG. 10, the housing 106 also includes an intermediate body portion or outer conductor engager 184. In this embodiment, the diameter dimension of the central bore 170 tapers, or decreases, from the inboard end portion 172 to define the outer conductor engager 184. The outer conductor engager 184 is configured to establish physical and electrical contact with the braided outer conductor 50, along the peripheral external surface thereof. Accordingly, a path of electrical continuity extends from the outer conductor 50 to the outer conductor engager 184, to the threaded outer conductor end 174.

In this embodiment, the intermediate body portion or outer conductor engager 184 is sized and shaped to have a slidable interface with the outer conductor 50. Likewise, the seal groove 180 is sized and shaped to have a slidable interface with the seal 182. Accordingly, the entire connector 100 is rotatable relative to the cable 4. During such rotation, the inner conductor 44 rotates within the inner conductor engager 102.

Figure 13:
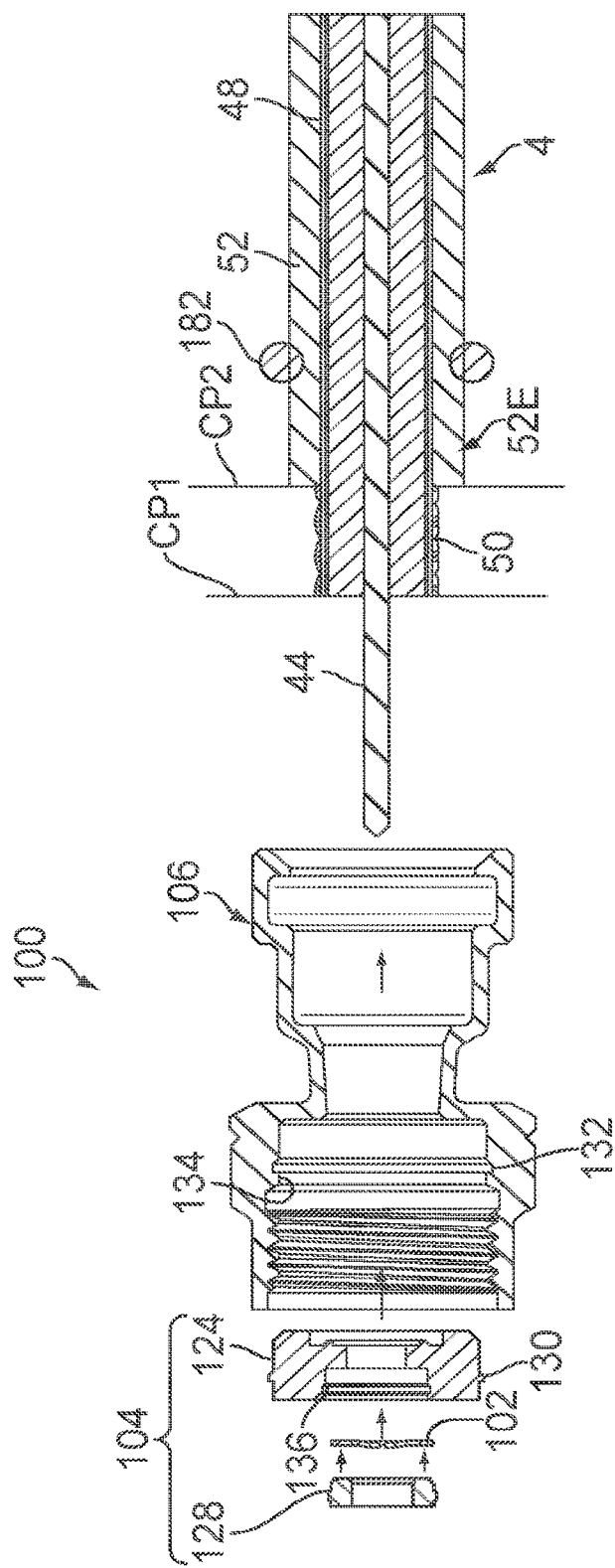
FIG. 13 is an exploded view of the connector of FIG. 9, depicting various steps associated with preparing the connector and cable for assembly.

Referring to FIGS. 6 and 13, the connector 100 is assembled by cutting away stepped portions of the cable 4 and assembling the inner conductor engager 102, driver 104, and housing 106 in combination with the inner and outer conductors 44, 50. In this embodiment, an installer prepares the cable 4 by making a first right-angle cut through the jacket 52, outer conductor 50, foil layer 48 and polymer insulator 46 along a first cutting plane CP1. The location of the cutting plane CP1 measures a desired length from the end of the cable 4. The installer then removes the material to produce a first step wherein a desired length of inner conductor 44 is exposed, i.e., extends beyond the cutting plane CP1. The installer makes a second right angle cut through the jacket 52 along a second cutting plane CP2. The location of the second cutting plane CP2 meas res a desired length from the first cutting plane CP1. The installer strips cut jacket material to produce a second step, exposing a length of the braided outer conductor 50. In the described embodiment, the distance of the first step, e.g., from the end of the first conductor 44 to the first cutting plane CP1, is between approximately 25.4 mm to approximately 127.0 mm. The distance of the second step, e.g., from the first cutting plane CP1 to the second cutting plane CP2, is also between approximately 25.4 mm to approximately 127.0 mm.

Figure 14:
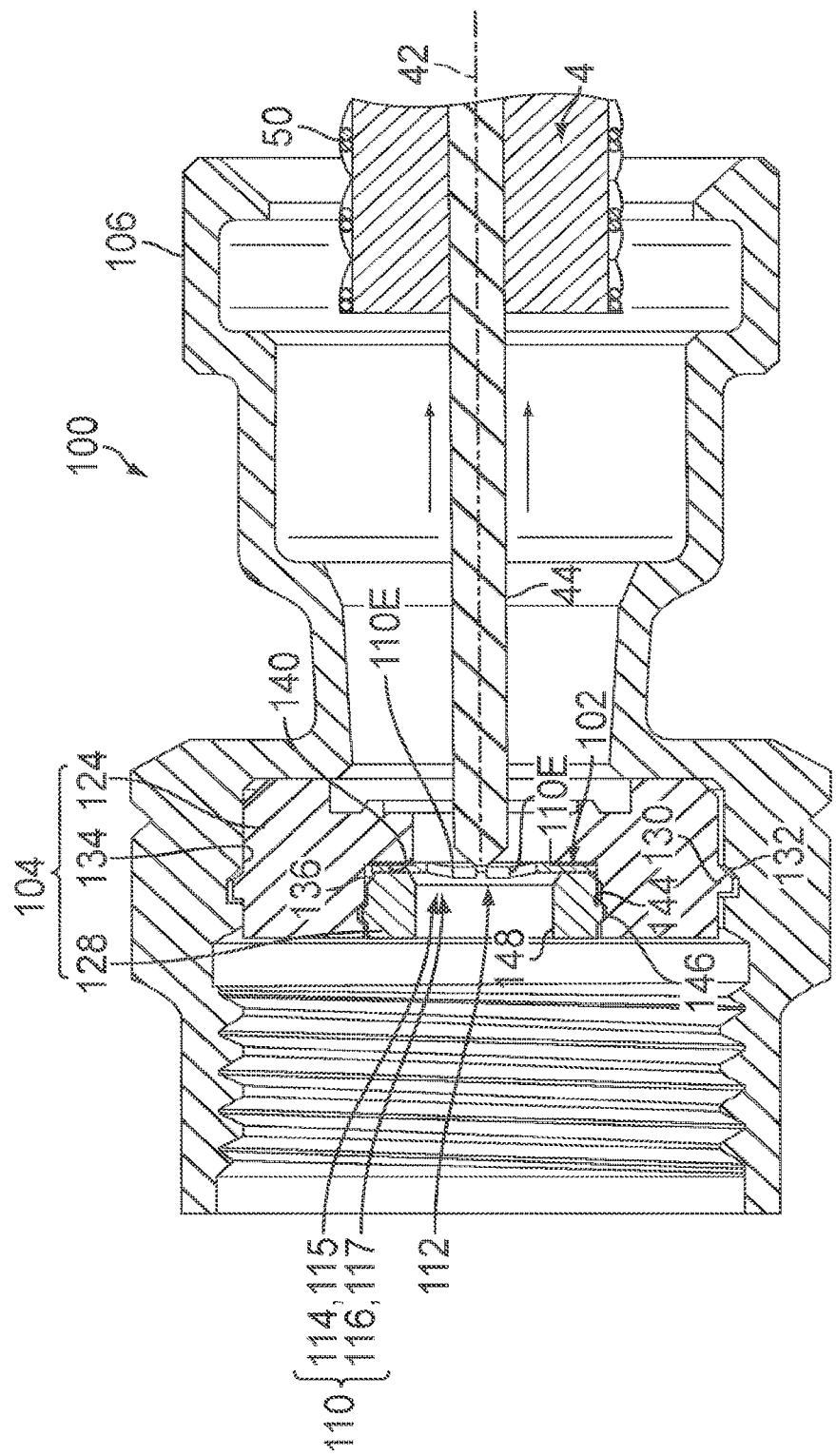
FIG. 14 is an enlarged, broken-away, sectional view depicting the driver assembled in combination with the housing for sliding the flexible tabs of the engager over a peripheral surface of the inner conductor.

In FIGS. 13 and 14, the connector 100 is assembled by inserting the inner conductor engager 102 into the recess 136 of the housing coupler 124 such that the peripheral edge of the inner conductor engager 102 abuts the shoulder 140 of the housing coupler 124. Next, the adaptor 128 of the driver 104 follows the inner conductor engager 102 into the recess 136 until the circumferential ring 144 of the adaptor 128 engages the ring-shaped groove 146 of the housing coupler 124. The engager-driver subassembly, couples to the housing 106 by inserting the driver 104 into the bore 134 of the housing 106 until the circumferential ring 130 of the driver 104 engages the ring-shaped groove 132.

The connector 100 aligns with cable 4 such that the opening 112 of the inner conductor engager 102 receives the inner conductor 44. Inasmuch as the opening 112 is smaller than the dimension D1 (see FIG. 11) of the inner conductor 44, the tabs 114-117 bend or flex to increase the size of the opening 112. More specifically, as the installer urges the housing 106 over the inner conductor 44, the driver 104, retained by the ring-shaped groove 132, urges the inner conductor engager 102 and tabs 114-117 over the inner conductor 44. The tabs 114-117 flex out-of-plane to enlarge the opening 112 such that the inner conductor engager 102 slides over the conductor 44 to a desired axial position along the longitudinal axis 42 of the cable 4. As mentioned supra, the void provided by the aperture 148 of the driver 104 is sufficiently large, i.e., provides the freedom necessary, for the tabs 114-117 to flex inwardly toward the interface port (not shown in FIG. 14).

At the same time, e.g., while the connector 100 slides over the inner conductor 44, the outboard end 172 (see FIG. 9) of the housing 106 slides over the O-ring seal 182 to seal the housing 106 from external contaminates, debris or foreign objects. Additionally, the tapered intermediate portion or outer conductor engager 184 of the housing 106 slides over and engages the outer conductor 50 of the cable 4. It will, therefore, be appreciated that the connector 100 of the present invention eliminates that step of folding the outer conductor 50 back over the outer jacket 52. Further, the step of radially compressing the outer jacket 52 against the outer conductor 50 to effect axial retention is also eliminated.

Once installed, the tabs 114-117 retain the position of the connector 100 relative to the inner conductor 44. That is, the arcuate edges 110E (see FIGS. 10 and 11) of the tabs 114-117 engage, bite and grip the peripheral surface of the conductor 44 when axial loads (represented by the force vectors A) pull the connector 100 away from the cable 4. Depending upon the embodiment, the tabs 114-117 can cut into the inner conductor 44, scrape away portions of the inner conductor 44 or tightly press against the inner conductor 44.

Another embodiment of the disclosure is shown in FIGS. 15-18, wherein a connector 200 comprises an inner conductor engager 202, a driver or ram 204, and a housing 206. Similar to the previous embodiment, the inner conductor engager 202, driver 204, and housing 206 co-axially align with each other and with the longitudinal axis 42 of the cable 4. In contrast thereto, however, the inner conductor engager 202 defines a non-engaging state as the inner conductor engager 202 receives the inner conductor 44. That is, the opening of the inner conductor engager 202 receives the inner conductor 44 without enlarging, biting or gripping it upon entry. Rather, an installer employs a compression tool to change the inner conductor engager 202 from its non-engaged state to an engaged state. In the engaged state, the inner conductor engager 202 receives and bites and/or grips the inner conductor 44 similar in function to the previously described inner conductor engager 102.

In the embodiment illustrated in FIG. 17, the inner conductor engager 202 includes at least one deformable tab 210 defining an opening 212. In this embodiment, the inner conductor engager 202 includes a plurality of deformable tabs 214, 215, 216 and 217 each having an arcuate-shaped edge 210E. In the described embodiment, each of the tabs 214-217 is deformable from a first position to a second position. In the first position, the deformable tabs 214-217 define an opening 212 having a diameter dimension DF which is larger than the cross-sectional diameter dimension D1 defined by the inner conductor 44. In the second position, the deformable tabs 214-217 define an opening 212 having a diameter dimension DS which is less than the diameter dimension DF, and less than or equal to the diameter dimension D1 such that the edges 220E engage the outer periphery of the inner conductor 44.

Similar to the flexible tabs of the previous embodiment, the tabs 214-217 project inwardly from a disc-shaped outer ring 220 toward a central axis 200A normal to a plane 220P defined by the ring 220. The tabs 214-217 are initially biased or configured out-of-plane relative to the outer ring 220 and deformed inwardly, by the driver or ram 204 toward the ring 220 to reduce the size of the diameter dimension or opening DF. While the tabs 214-217 inherently have an elastic deformation region, the tabs 214-217 deform plastically from the first to the second position, and, accordingly, remain in the second position following plastic deformation thereof. As will be described in greater detail below, the diameter dimension or opening 212 defined by the tabs 214-217 is initially larger than the cross-sectional diameter dimension D1 of the inner conductor 44 to facilitate assembly of the connector 200 with a prepared end of the coaxial cable 4.

The inner conductor engager 202 may comprise a deformable metal which is harder than the material which forms the inner conductor 44. A hard metal material may be employed to ensure that the edges 210E of the tabs 214-217 score the peripheral surface of the inner conductor 44. In the described embodiment, the inner conductor engager 202 comprises a stainless steel, brass, aluminum, or steel/aluminum alloy having a thickness of approximately 0.05 mm to approximately 0.25 mm. The yield strength of the material is approximately $2.75 \times 10^7$ N/m$^2$ to approximately $7.5 \times 10^7$ N/m$^2$.

The driver or ram 204 includes a housing coupler 224 and an adaptor 228. More specifically, the housing coupler 224 includes a circumferential ring 230 for engaging a ring-shaped groove 232 (see FIG. 18) formed within an internal bore 234 of the housing 206. Furthermore, the housing coupler 224 includes an aperture 236 for receiving the adaptor 228 and a shoulder 240 for engaging an inboard end of the inner conductor engager 202.

The mounting arrangement between the housing coupler 224 and the adaptor 228 includes a similar ring and groove arrangement, however, the adaptor 228 includes a circumferential ring 244 which can engage a first and a second groove 246 and 247, respectively. The first ring-shaped groove 246 provides a staging or "ready" position for the adaptor 228 in preparation for driving or deforming the tabs 214-217 of the inner conductor engager 202 into the second position. The staging position of the adaptor 228 corresponds to the first position of the deformable tabs 214-217.

The circumferential ring 244 of the adaptor 228 engages the second ring-shaped groove 247 following the use of a compression tool which drives the adaptor 228 against the deformation tabs 214-217. Movement of the adaptor 228 from the first to the second ring-shaped grooves 246, 247 deforms the edges 210E of the tabs 214-217 into the peripheral surface of the inner conductor 44. This deforming position corresponds to the second position of the deformable tabs 214-217. In this way, the adaptor 228 functions as a ram or inner conductor engager ram.

While the driver 204 is shown to include multiple segments, it should be appreciated that the housing coupler 224 and adaptor of the driver 204 may be a unitary structure. Similar to the previous embodiment, the multi-segment driver 204 provides a degree of modularity, e.g., the ability to interchangeably integrate one type/size of driver 204 with a different type/size of engager 204 or a larger/smaller housing 206.

Figure 15:
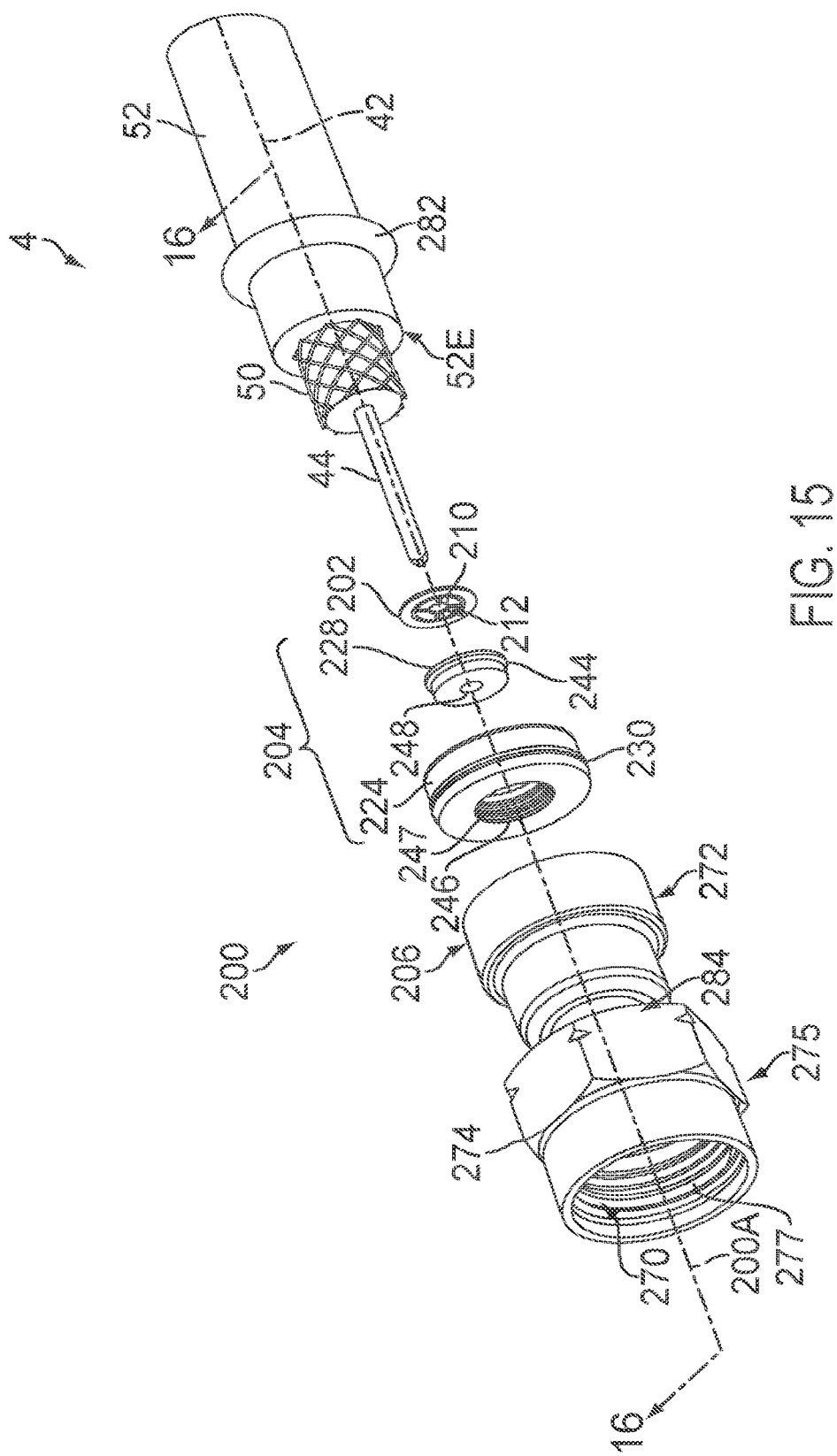
FIG. 15 is an exploded isometric view of a cable connector according to another embodiment of the disclosure wherein an inner conductor engager having a plurality of deformable tabs couples a connector housing to a cable.
Figure 16:
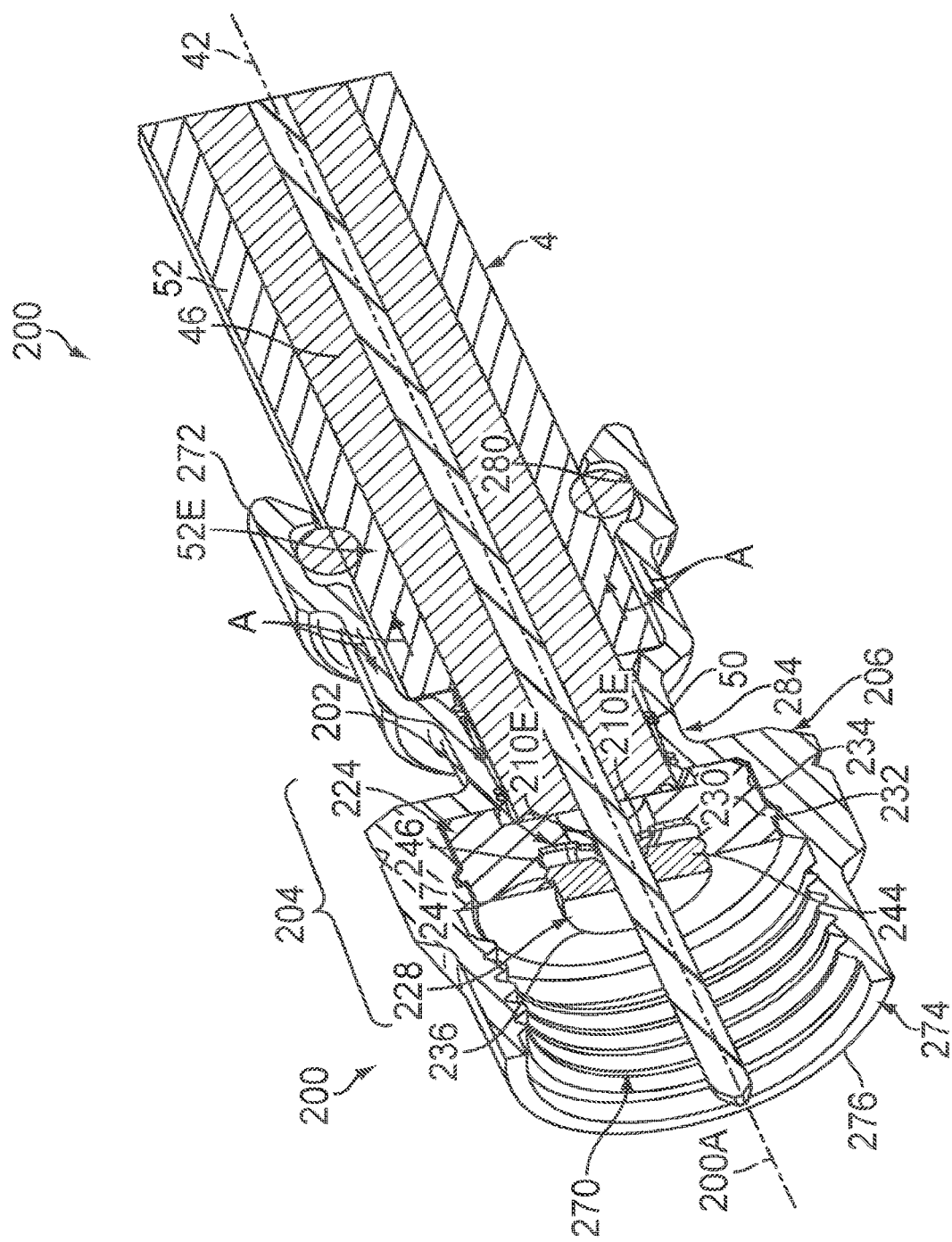
FIG. 16 is an assembled cross-sectional view of the cable connector taken substantially along line 16-16 of FIG. 15.

Inasmuch as the driver 204 has the potential to electrically interconnect the first and second conductors 44, 50, the driver 204 comprises a dielectric material to pr v nt or inhibit the flow of current and/or an electrical short between the inner and outer conductor 44, 50. In the described embodiment, the housing coupler 224 and adaptor 228 are fabricated from a TPX® polymethypentene or other polymer material, e.g., polyethylene, polyimide, polyurethane materials, having a dielectric constant (sometimes referred to as the relative permittivity) of less than about 2.12 kHz The body or housing 206 defines a central bore 270 which circumscribes and receives the driver 204. More specifically, the housing 206 includes inboard and outboard end portions 272 and 274, respectively, wherein the inboard end portion 262 extends over and circumscribes a terminal end 52E of the jacket 52 and the outboard end portion 274 rotationally mounts an outer conductor end 276. The outboard end portion 274 includes an integral nut member or other suitable interface port coupling member 275. As illustrated in FIG. 15, the port coupling member 275 includes a cylindrical, inner wall having threads 277. Though the illustrated embodiment includes a female-configured the port coupling member 275, it should be appreciated that the other embodiments can include a male port coupling member.

In the described embodiment, the inboard end portion 272 includes an O-ring groove or seal groove 280 formed in an internal wall of the housing 206 and a seal or an O-ring 282 disposed in the O-ring groove 280 between the housing 206 and the jacket 52.

The housing 206 also has an intermediate body portion or outer conductor engager 284. The diameter dimension of the central bore 270 tapers, or decreases, from the inboard end portion 272 to define the outer conductor engager 284. The outer conductor engager 284 is configured to establish physical and electrical contact with the braided outer conductor 50, along the peripheral external surface thereof. Accordingly, a path of electrical continuity extends from the outer conductor 50 to the outer conductor engager 284, to the threaded outer conductor end 274.

Figure 19:
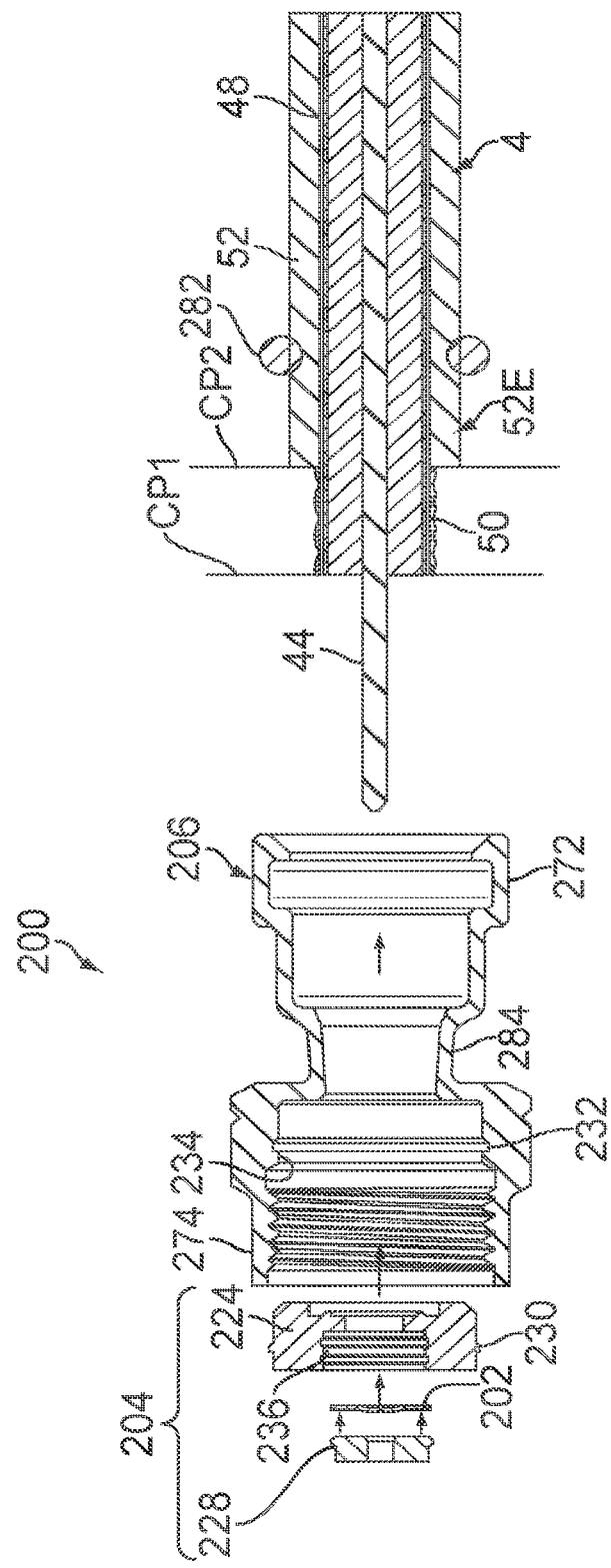
FIG. 19 is an exploded view of the connector of FIG. 15, illustrating various steps associated with preparing the connector and cable for assembly.

Referring to FIGS. 6 and 19, in this embodiment of the disclosure, the connector 200 is assembled by cutting away stepped portions of the cable and assembling the inner conductor engager 202, driver 204, and housing 206 in combination with the inner and outer conductors 44, 50. In this embodiment, an installer prepares the cable 4 by making a first right-angle cut through the jacket 52, outer conductor 50, foil layer 48 and polymer insulator 46 along a first cutting plane CP1. The location of the cutting plane CP1 measures a desired length from the end of the cable 4. The installer then removes the material to produce a first step wherein a desired length of inner conductor 44 is exposed, e.g., extends beyond the cutting plane CP. The installer makes a second right angle cut through the jacket 52 along a second cutting plane CP2. The location of the second cutting plane CP2 measures a desired length from the first cutting plane CP1. The installer strips the jacket material to produce a second step, exposing a length of the braided outer conductor 50. In the described embodiment, the distance of the first step, e.g., from the end of the first conductor 44 to the first cutting plane CP1 is between approximately 25.4 mm to approximately 127.0 mm. The distance of the second step, e.g., from the first cutting plane CP1 to the second cutting plane CP2, is also between approximately 25.4 mm to approximately 127.0 mm.

Figure 20:
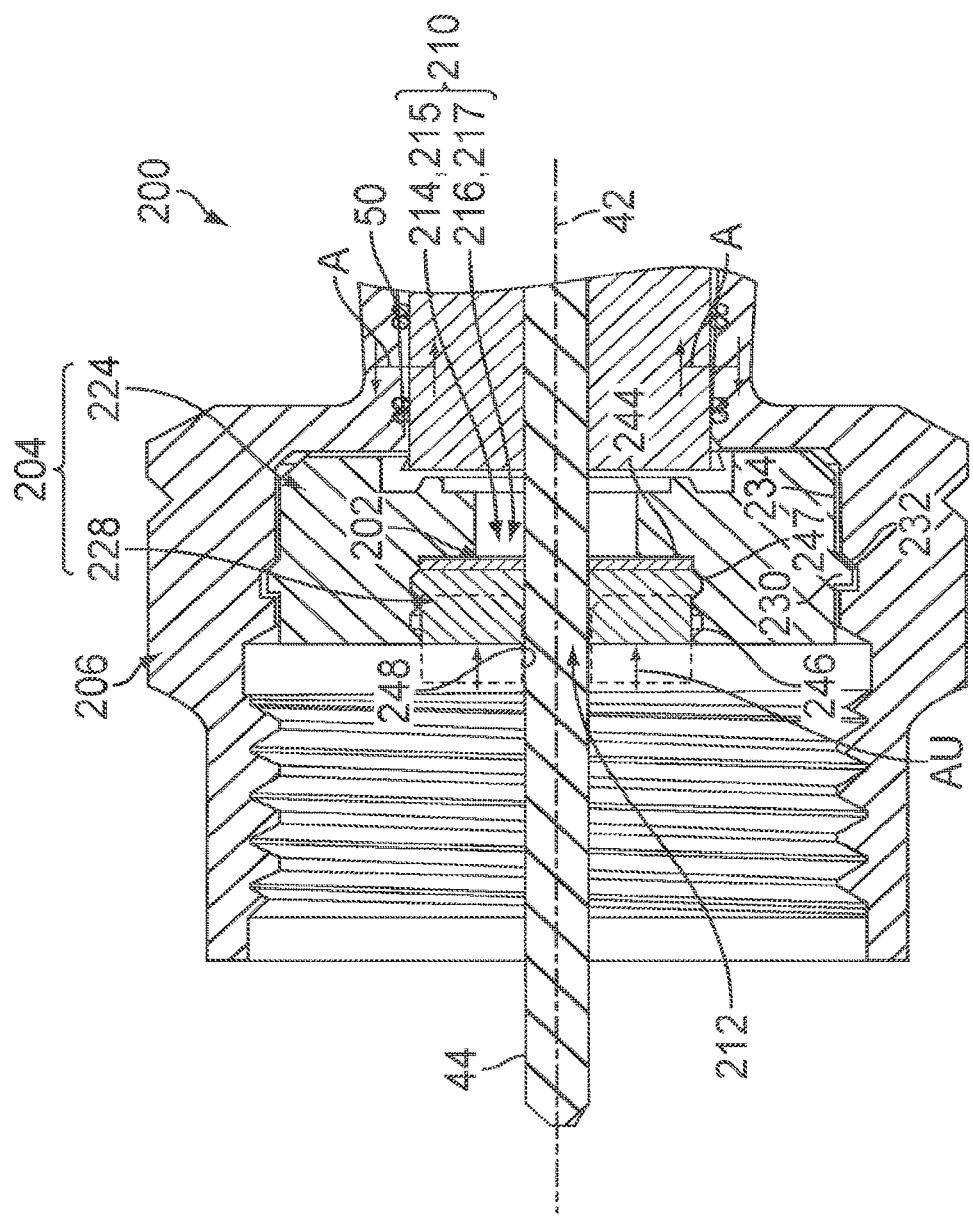
FIG. 20 is an enlarged, broken-away, sectional view depicting a ram urging the deformable tabs into engagement with the inner conductor of the cable.
Figure 21:
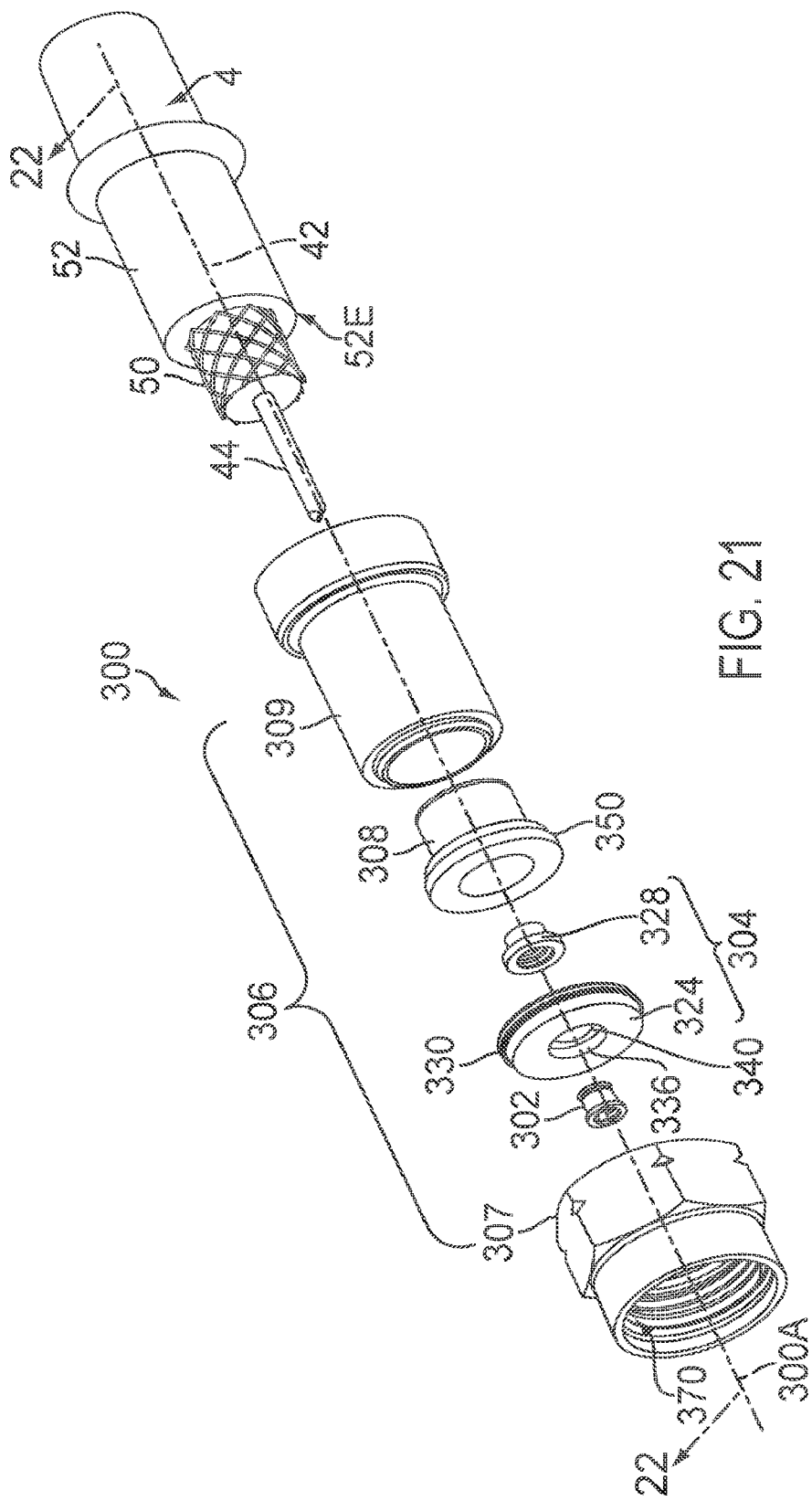
FIG. 21 is an exploded isometric view of a cable connector according to another embodiment of the disclosure wherein an inner conductor engager having a knurled or toothed deformable ring couples a connector housing to a cable.
Figure 22:
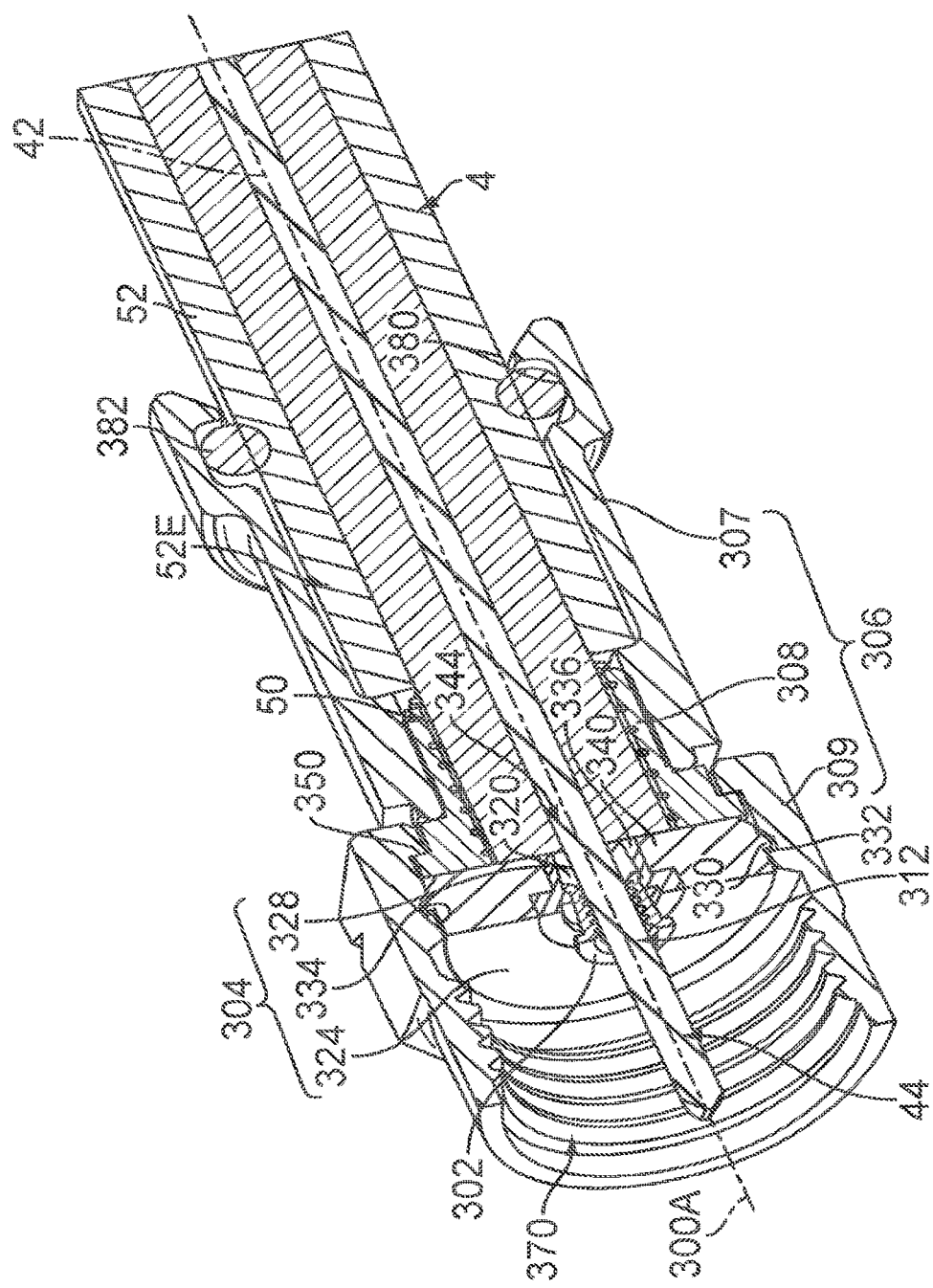
FIG. 22 is an assembled cross-sectional view of the cable connector taken substantially along line 22-22 of FIG. 21.
Figure 24:
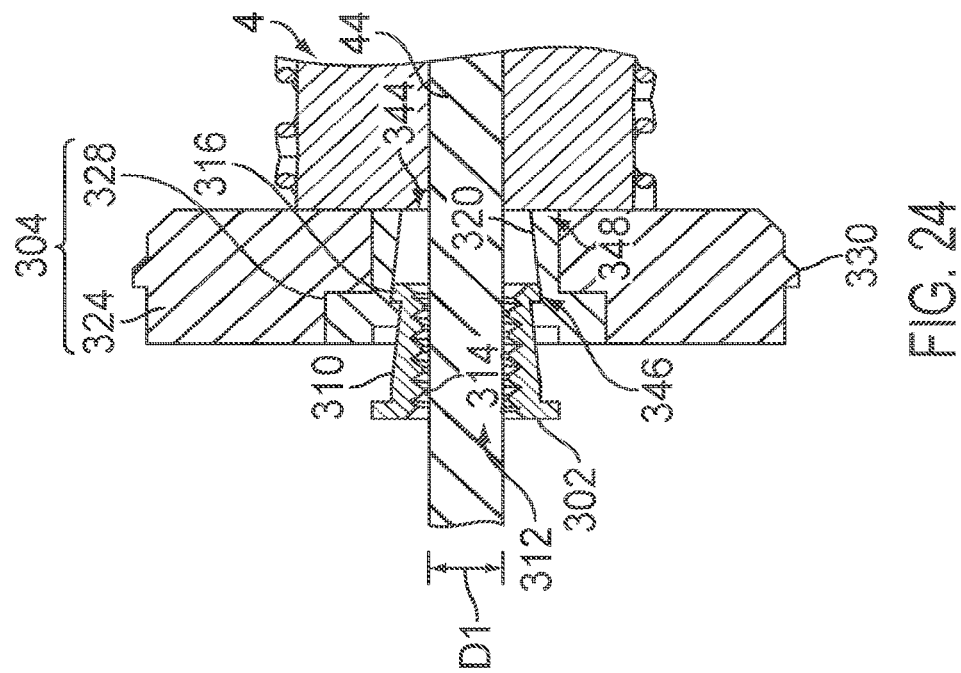
FIG. 24 is an enlarged, broken-away, sectional view of the inner conductor engager, shown in FIG. 21, disposed in combination with the inner conductor.
Figure 23:
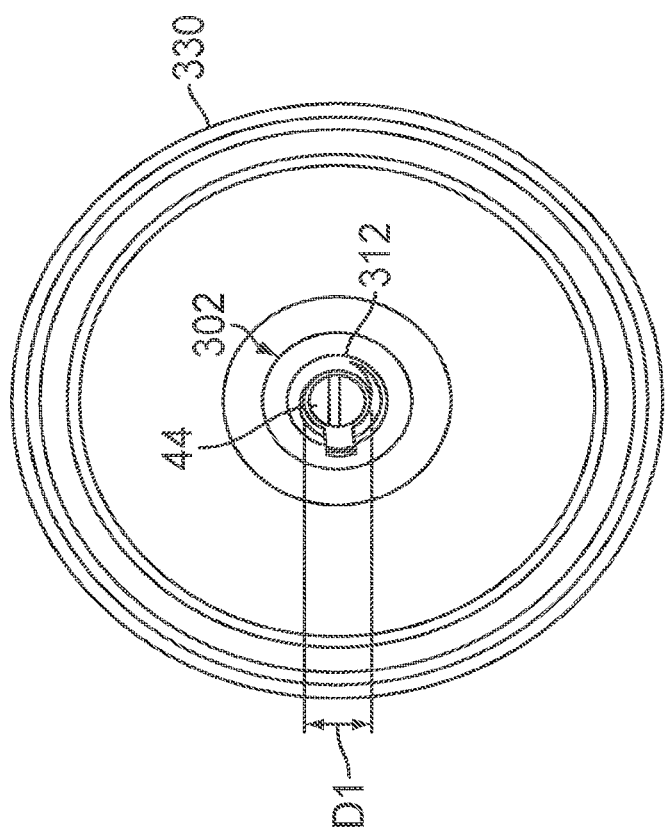
FIG. 23 is an isolated plan view of the inner conductor engager wherein the deformable sleeve collapses in response to a radial load.

In FIGS. 19 and 20, the connector 200 is assembled by inserting the inner conductor engager 202 into the recess 236 of the adaptor 228 such that the peripheral edge of the inner conductor engager 202 abuts the shoulder 240 of the housing coupler 224. The adaptor 228 of the driver 204 follows the inner conductor engager 202 into the recess 236 until the circumferential ring 244 of the adaptor 228 engages the first ring-shaped groove 247 of the housing coupler 224. This staging position is shown in dashed lines in FIG. 20 of the drawings.

Next, the engager-driver subassembly, couples to the housing 206 by inserting the driver 204 into the bore 234 of the housing 206 until the circumferential ring 230 of the driver 204 engages the ring-shaped groove 232. The installer then aligns the connector 200 with the cable 4 such that the opening 212 of the inner conductor engager 202 receives the innerconductor 44. Inasmuch as the opening 212 is initially larger than the dimension D1 (see FIG. 17) of the inner conductor 44, the connector 200 slides freely over the inner conductor 44. At the same time, i.e., while the connector 200 slides over the inner conductor 44, the outboard end 272 of the housing 206 slides over the O-ring seal 282 to seal the housing 206 from the external elements, i.e., foreign objects. Additionally, the outer conductor engager 284 of the housing 206 slides over and engages the outer conductor 50 of the cable 4.

When the connector 200 reaches the first cutting plane CP1, corresponding to the first step in the cable 4, the installer employs a deformation or compression tool to urge the adaptor 228 into the deformation position. That is, a compression tool moves the ram or adaptor 228 in the direction of the arrows AU such that the ram element or circumferential ring 244 engages the second ring-shaped groove 247. This motion causes the tabs 214-217 to frictionally engage the peripheral surface of the inner conductor 44 to lock the inner conductor engager 202 into the second position.

Once installed, the tabs 214-217 retain the position of the connector 200 relative to the inner conductor 44. That is, the arcuate edges 210E (see FIG. 20) of the tabs 214-217 engage, bite and grip the peripheral surface of the conductor 44 when an axial load (represented by the moment couple A) pulls the connector 200 away from the cable 4.

FIGS. 21-24 depict another embodiment of the disclosure wherein a connector 300 includes an inner conductor engager 302, a driver or compressor 304 and a housing 306. In the described embodiment, the inner conductor engager 302, driver 304 and housing 306 are co-axially aligned and include a deformable ring or sleeve structure 310 (best seen in FIG. 24) defining an opening 312. The opening 312 is predisposed to be initially larger than a cross-sectional dimension D1 of the inner conductor 44. In the illustrated embodiment, the inner conductor engager 302 includes a plurality of threads or teeth 314 disposed along an internal gripping surface of the deformable ring/sleeve 310. While the deformable ring/sleeve 310 includes a plurality of teeth or threads, it should be appreciated that any gripping surface may be employed. For example, the gripping surface may include a knurled or serrated inner surface.

The deformable sleeve 310 is split longitudinally such that the sleeve 310 may deform radially to decrease the size of the opening 312. In the described embodiment, the deformable ring/sleeve 310 also includes a load-bearing surface 316 (FIG. 24) which translates axially along, and engages, a tapered inner surface 320 of the driver 304. The function of the load-bearing surface 316 will become evident when discussing the function of the driver 304 in greater detail.

In the described embodiment, the deformable ring/sleeve 310 may comprise a deformable metal such as a stainless steel, brass, aluminum, or steel/aluminum alloy having a thickness of approximately 0.05 mm to approximately 0.25 mm. The yield strength of the material is approximately $2.75 \times 10^7$ N/m² to approximately $7.5 \times 10^7$ N/m².

The driver or compressor 304 includes a housing coupler 324 and an adaptor 328 which collectively interpose the inner conductor engager 302 and the housing 306. More specifically, the housing coupler 324 includes a circumferential ring 330 for engaging a ring-shaped groove 332 (see FIG. 22) formed within an internal bore 334 of the housing 306. Furthermore, the housing coupler 224 includes a recess 336 for receiving the adaptor 328 and a shoulder 340 for engaging a flange 342 of the adaptor 328.

The adaptor 328 includes an aperture 344 for receiving the inner conductor 44 of the cable 4. Furthermore, as mentioned in a preceding paragraph, the aperture 344 of the adaptor 328 includes a tapered inner surface 320 for engaging the bearing surface 316 of the deformable sleeve 310. More specifically, the inner surface 320 defines a frusto-conical surface which decreases in diameter dimension from an outboard end 346 to an inboard end 348.

While the driver 304 is shown to include multiple segments, it should be appreciated that the driver 304 may be a unitary structure. Similar to the previous embodiment, the multi-segment driver 304 of this embodiment provides a degree of modularity, e.g., the ability to interchangeably integrate one type/size of driver 304 with a different type/size of engager or a larger/smaller housing.

Inasmuch as the driver 304 has the potential to electrically interconnect the first and second conductors 44, 50, the driver 304 comprises a dielectric material to prevent an electrical short between the inner and outer conductor 44, 50. In the described embodiment, the housing coupler 324 and adaptor 328 are fabricated from a TPX® polymethypentene or other polymer material, e.g., polyethylene, polyimide, polyurethane materials, having a dielectric constant (sometimes referred to as the relative permittivity) of less than about 2.12 kHz The housing 306 includes an inboard end portion 307, a threaded outboard end portion 309, and an intermediate portion 308 disposed therebetween. More specifically, the inboard end portion 307 extends over and circumscribes a terminal end 52E of the jacket 52. The intermediate portion 308 is journal mounted to the inboard end portion 307. The threaded outboard end portion 309 rotationally mounts to a flange 350 of the intermediate portion 308. It should be appreciated that the rotational mount between the intermediate and outboard end portions 308, 309 maintains electrical continuity across the connection.

In the described embodiment, the inboard end portion 307 includes an O-ring groove 380 for accepting an O-ring 382 between the housing 306 and the jacket 52. The intermediate portion 308 tapers or defines a diameter dimension which contacts the braided outer conductor 50, i.e., long the peripheral external surface thereof. Accordingly, electrical continuity is provided between the outer conductor 50 and the threaded outer end portion 309, i.e., across the rotational mount between the intermediate and outboard end portions 308, 309.

In this embodiment of the disclosure, the connector 300 is assembled by cutting away stepped portions of the cable and assembling the inner conductor engager 302, driver 304, and housing 306 in combination with the inner and outer conductors 44, 50, In this embodiment, an installer prepares the cable 4 by making a first right-angle cut through the jacket 52, outer conductor 50, foil layer 48 and polymer insulator 46 along a first cutting plane CP1 The location of the cutting plane CP1 measures a desired length from the end of the cable 4. The installer then removes the material to produce a first step wherein a desired length of inner conductor 44 is exposed, i.e., extends beyond the cutting plane CP. The installer makes a second right angle cut through the jacket 52 along a second cutting plane CP2. The location of the second cutting plane CP2 measures a desired length from the first cutting plane CP1. The installer strips the jacket material to produce a second step, exposing a length of the braided outer conductor 50. In the described embodiment, the distance of the first step, i.e., from the end of the first conductor 44 to the first cutting plane CP1 is between approximately 25.4 mm to approximately 127.0 mm. The distance of the second step, e.g., from the first cutting plane CP1 to the second cutting plane CP2, is also between approximately 25.4 mm to approximately 127.0 mm.

Figure 25:
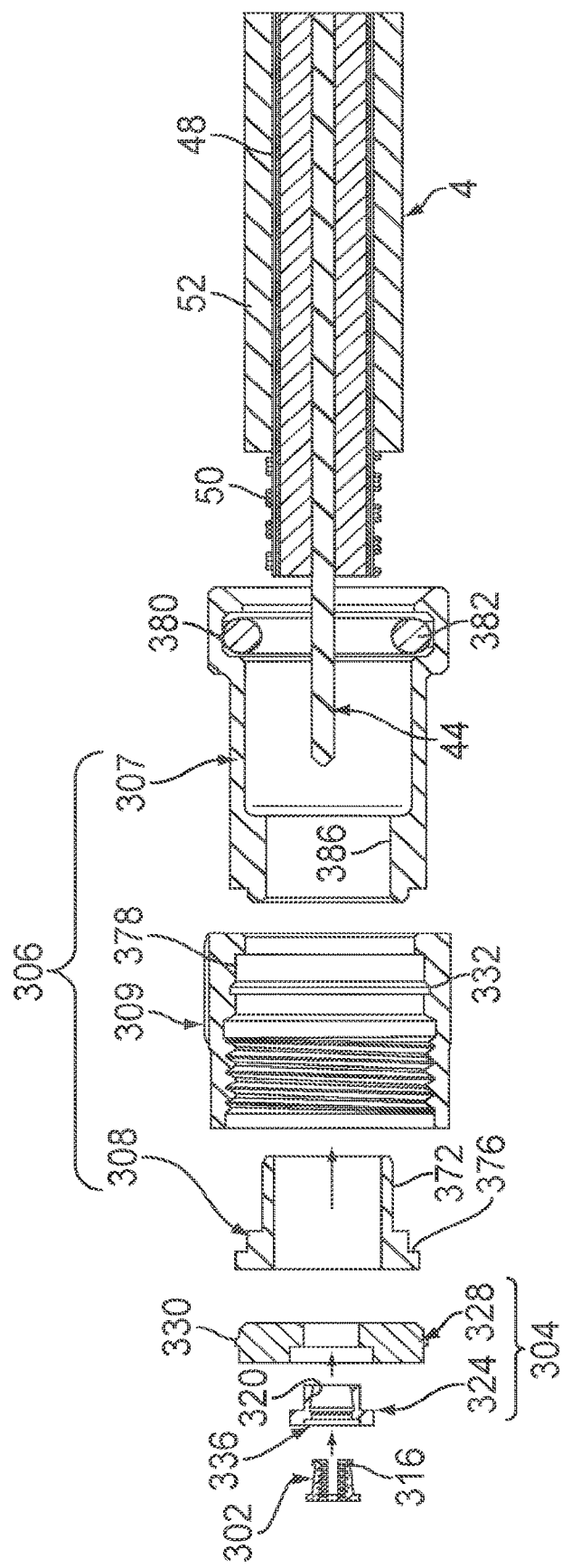
FIG. 25 is an exploded view of the connector of FIG. 21, illustrating various steps associated with preparing the connector and cable for assembly.
Figure 26:
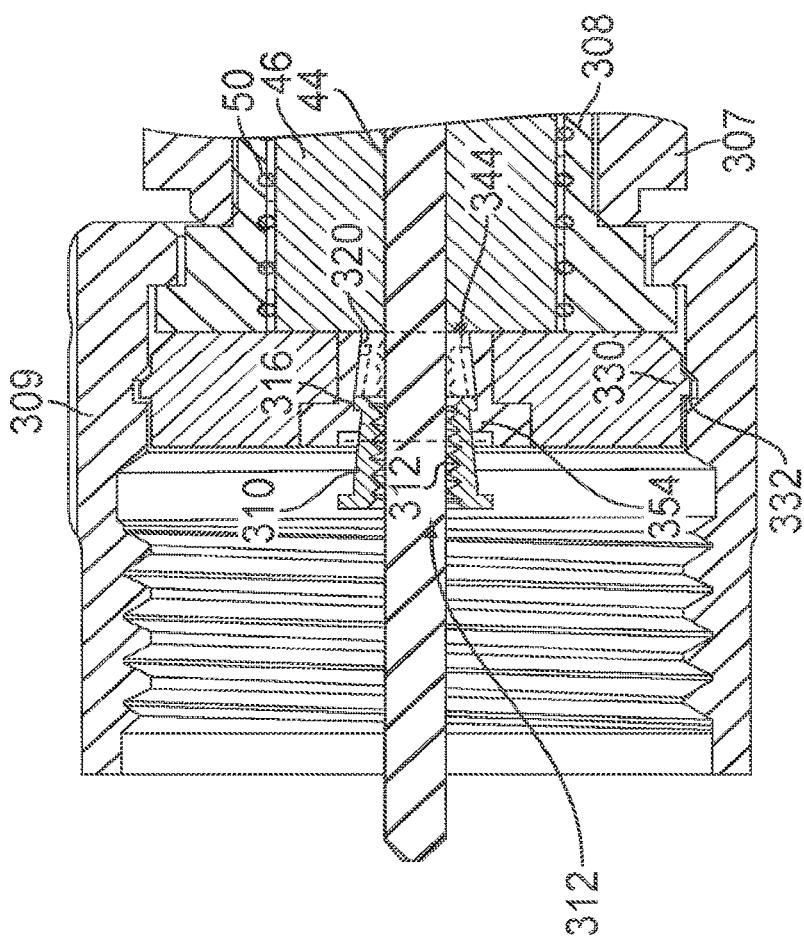
FIG. 26 is an enlarged, broken-away, sectional view depicting the a compressor urging the deformable ring into engagement with the inner conductor of the cable.

In FIGS. 25 and 26, the connector 300 is assembled by inserting the inner conductor engager 302 into the recess 336 of the adaptor 324 such that the bearing surface 316 engages the tapered inner surface 320 thereof. Furthermore, an internal shoulder 354 engages the bearing surface 316 to secure the inner conductor engager 302 within aperture 344 of the adaptor 324. The engager/adaptor subassembly sits in the recess 336 and seats against the shoulder of the housing coupler 324. In this way, the bearing surface 316 functions as a stop, locking the inner conductor engager 302 in the assembled position.

Next, the intermediate portion 308 of the housing 306 is placed within the bore 370 of the outboard threaded end portion 309. A flange 376 of the intermediate portion 308 engages a shoulder 378 of the outboard threaded end portion 309. Furthermore, a cylindrical inboard end 372 of the intermediate portion 308 extends beyond the outboard threaded end portion 309 and is journal mounted within a sleeve or bore 386 of the inboard end portion 307.

Next, the engager-driver subassembly, follows the intermediate portion 308 into the bore 370 of the threaded outboard end portion until the circumferential ring 330 of the driver 304 engages the ring-shaped groove 332 of the threaded outboard end portion 309.

The installer aligns the connector 300 with the cable 4 such that the opening 312 of the inner conductor engager 302 receives the inner conductor 44. Inasmuch as the opening 312 is initially larger than the dimension D1 (see FIG. 23) of the inner conductor 44, the connector 300 slides freely over the inner conductor 44. At the same time, i.e., while the connector 300 slides over the inner conductor 44, the inboard end 307 of the housing 306 slides over the O-ring seal 382 to seal the housing 306 from the external elements, e.g., foreign objects. Additionally, the intermediate portion 308 of the housing 306 slides over and engages the outer conductor 50 of the cable 4.

When the connector 300 reaches the first cutting plane CP1, corresponding to the first step in the cable 4, the installer employs a deformation or compression tool to urge the deformable sleeve 310 into the adaptor 328. As the sleeve 310 translates axially from a first position shown in solid lines to a second position shown in dashed lines, the tapered inner surface 320 of the adaptor 328 deforms the sleeve 310 radially into the inner conductor 44 of the cable. That is, the radial motion causes the threads or teeth 312 of the sleeve 310 to frictionally engage the peripheral surface of the inner conductor 44 to lock the inner conductor engager 302 into the second position. Once installed, the deformable sleeve 310 retains the position of the connector 300 relative to the inner conductor 44.

Figure 27:
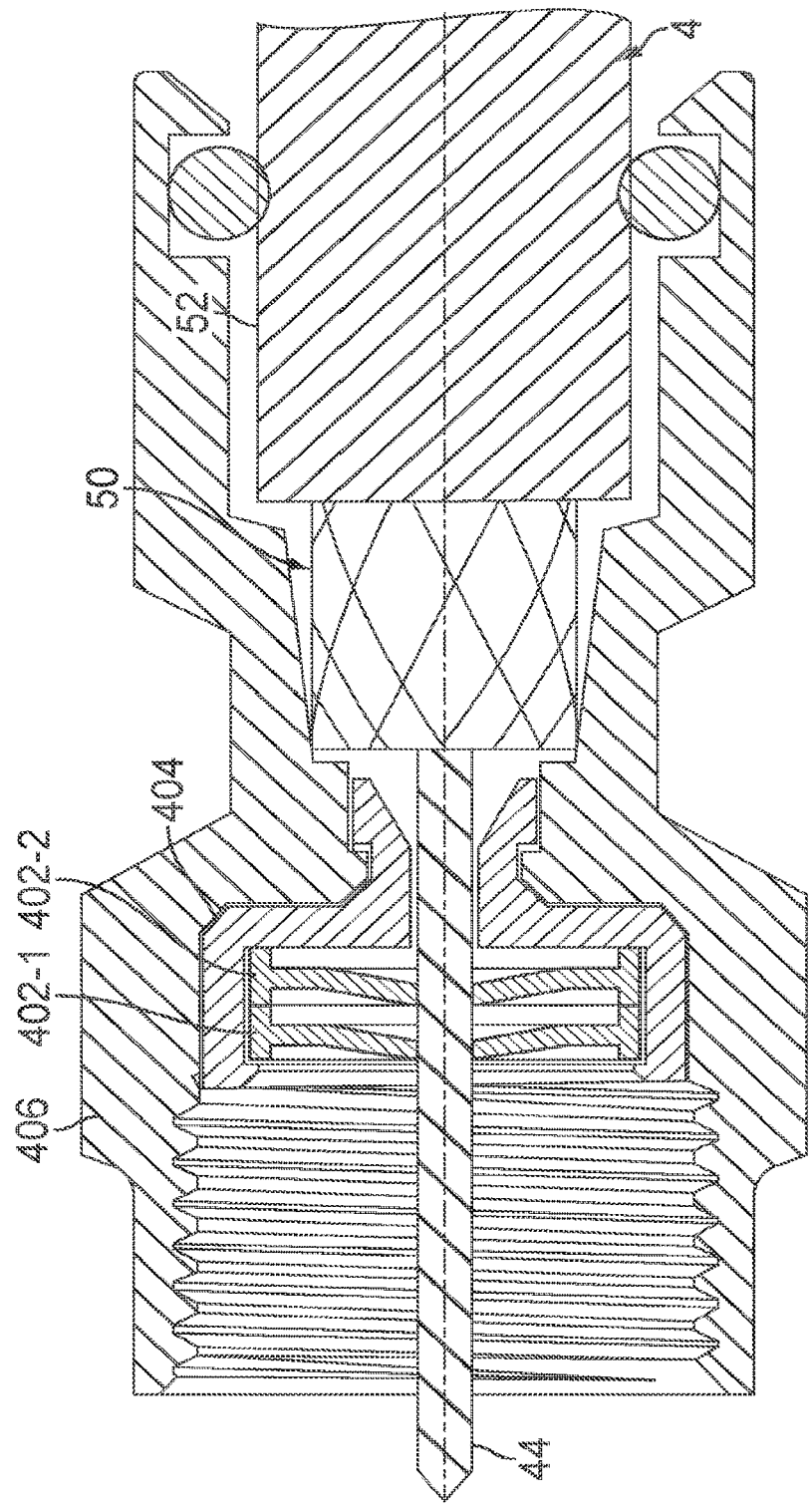
FIG. 27 is a sectional view of another embodiment of the connector comprising a comprising a plurality of co-axially aligned inner conductor engagers which are stacked along the inner connector.

In another embodiment shown in FIG. 27, the connector 400 includes a plurality of engagers 402-1, 402-2, a driver 404 and a housing 406. In this embodiment, the engagers 402-1, 402-2 stack within a recess 408 of the driver 404. Each of the engagers 402-1, 402-2 may be similar to those described in previous embodiments and, consequently, may include a plurality of flexible or deformable tabs 410. In a first of the stacked embodiments wherein the tabs 410 are flexible, the opening 412 produced by the tabs 410 are smaller than a cross-sectional dimension of the inner conductor. The flexible tabs 410 of the stacked engagers 402-1, 402-2, are driven over the inner conductor 44 to a desired axial position along the inner conductor 44.

In a second of the stacked embodiments where the tabs 410 are deformable, the opening produced by the tabs 410 is larger than a cross-sectional dimension of the inner conductor. In this embodiment, a deformation tool collectively deforms the tabs 410 of the engagers 402-1, 402-2 into engagement with the inner conductor 44 of the cable 4.

While certain embodiments of the present disclosure employ deformable tabs, fingers, rings or sleeves, others rely on flexure of the inner conductor engager. In these embodiments, the flexible inner conductor engager is not destroyed but may be flexed in an opposite direction to decouple the engager from the inner conductor.

The connectors, 100, 200, 300 and 400 of the present disclosure react axial forces as a tensile load in the inner conductor 44 of the cable 4. Inasmuch as the inner conductor 44 has a tensile strength which is substantially larger than the nearly forty-percent (40%) greater than the strength of the braided outer conductor 50, the connector 200 of the present disclosure can react significantly higher loads than conventional connectors. Additionally, the connectors 100, 200, 300 and 400 of the present disclosure reduce the time required to prepare the cable for connector assembly. More specifically, the cable 4 is prepared simply by making two right-angle cuts, i.e., along the first and second cutting planes CP1, CP2. The connectors 100, 200, 300 and 400 then slide axially into position, i.e., until the inner conductor engager 202 or driver 204 abuts the insulator 46 of the cable 4.

Accordingly, the connectors 100, 200, 300, 400 of the present disclosure provide a load path through the steel inner conductors 44 of the cable 4 rather than through the braided outer conductor 50 of the cable 4. This alternate load path eliminates the requirement for structural augmentation of the connector, including the need for a cylindrical post between the braided outer conductor and inner layer of foil. By eliminating the cylindrical post, the connectors 100, 200, 300, 400 eliminate the laborious and cumbersome steps associated with cutting, folding and clamping the braided outer conductor 50 against the post. As a result, connectors 100, 200, 300, 400 of the present disclosure enhance strength and minimize cost of assembly.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A cable connector that provides improved axial retention of a cable comprising:
   a first insulating insert portion configured to be disposed in a coupler portion such that the coupler portion is configured to rotate relative to the first insulating insert portion;
   a second insulating insert portion configured to be disposed in at least a portion of the first insulating insert portion;
   a conductor retainer portion configured to be received in at least a portion of the first insulating insert portion;
   wherein the first insulating insert portion includes a radially outer surface having an insulating insert engagement portion configured to engage an coupler engagement portion of a radially inner surface of the coupler portion to secure the first insulating insert portion relative to the coupler portion so as to restrict axial movement of the first insulating insert portion from moving relative to the couple portion in an axial direction that extends along a direction parallel to a longitudinal direction of the cable connector;
   wherein the first insulating insert includes a radially inner surface having an engagement structure configured to receive an engagement structure on a radially outer surface of the second insulating insert to secure the second insulating insert portion relative to the first insulating insert portion so as to restrict axial movement of the second insulating insert portion relative to the first insulating insert portion in the axial direction;
   wherein the first insulating insert portion and the second insulating insert portion are configured to restrict the conductor retainer portion from moving in the axial direction between a forward facing surface of the first insulating insert portion and a rearward facing surface of the second insulating insert portion;
   wherein the conductor retainer portion includes a plurality of flexible tabs;
   wherein the first insulating insert portion is configured to engage a radially outward portion of the conductor retainer portion that is located radially outward of each of the plurality of flexible tabs; and wherein the plurality of flexible tabs are configured to receive an inner conductor portion of a cable such that the inner conductor portion is free to pass through at least a portion of an opening that is formed by the plurality of flexible tabs in a first direction toward the coupler portion to a retained configuration, and are configured to restrict the inner conductor portion in the retained configuration so as to restrict the inner conductor portion from passing through the conductor retainer portion in a second direction opposite to the first direction so as to improve axial retention of the cable during operation of the connector.

2. The connector of claim 1, wherein the plurality of flexible tabs define a central aperture having a diameter configured to receive the inner conductor of the coaxial cable, and the conductor retainer portion includes a plurality of radial openings configured to define the plurality of flexible tabs that allow movement of the inner conductor of the coaxial cable in the first direction and prevents movement of the inner conductor in the second direction.

3. The connector of claim 1, wherein the plurality of flexible tabs are configured to move outwardly upon insertion of the inner conductor of the coaxial cable such that an end of each of the plurality of flexible tabs engages the inner conductor to prevent movement of the inner conductor in the second direction.

4. The connector of claim 1, wherein the first insulating insert portion and the second insulating insert portion are configured to electrically insulate the conductor retainer portion from the coupler portion.

5. A cable connector that provides improved axial retention of a cable comprising:
a first insulator portion configured to be disposed relative to a coupler portion such that a coupler nut portion of the coupler portion is configured to rotate relative to the first insulator portion;
a second insulator portion configured to be disposed in at least a portion of the first insulator portion;
a conductor retainer portion configured to be received in at least a portion of the first insulator portion;
wherein the first insulator portion includes a first insulator engagement portion that is configured to engage a coupler engagement structure on the coupler portion so as to restrict axial movement of the first insulator portion relative to the coupler portion in an axial direction;
wherein the first insulator portion includes a second insulator engagement portion configured to engage an insulator engagement portion on the second insulator portion so as to restrict axial movement of the second insulator portion relative to the first insulator portion in the axial direction;
wherein the first insulator portion and the second insulator portion are configured to restrict the conductor retainer portion in the axial direction; and
wherein the conductor retainer portion is configured to receive at least a portion of an inner conductor of a cable such that the inner conductor is free to pass through at least a portion of the conductor retainer portion in a first direction toward the coupler portion to a retained configuration, and is configured to restrict the inner conductor in the retained configuration from passing through the conductor retainer in a second direction that is different from the first direction so as to axially restrict movement of the cable during operation of the connector.

6. The connector of claim 5, wherein the coupler portion is electrically conductive.

7. The connector of claim 5, wherein the first insulator engagement portion comprises a circumferential ridge and the coupler engagement structure comprises an annular groove.

8. The connector of claim 5, wherein the second insulator engagement portion comprises an annular groove and the insulator engagement portion on the second insulator portion comprises a circumferential ridge.

9. The connector of claim 5, wherein the first insulator portion and the second insulator portion are configured to retain the conducting retainer portion in the axial direction between a forward facing surface of the first insulator portion and a rearward facing surface of the second insulator portion.

10. The connector of claim 5, wherein the conductor retainer portion includes a plurality of flexible tabs, and wherein the first insulator portion is configured to engage the conductor retainer portion radially outward of the flexible tabs.

11. The connector of claim 5, wherein the conductor retainer portion includes a plurality of flexible tabs configured to define a central aperture having a diameter configured to receive the inner conductor of the coaxial cable, and the conductor retainer portion includes a plurality of radial openings configured to define the plurality of flexible tabs that allow movement of the inner conductor of the coaxial cable in the first direction and prevents movement of the inner conductor in the second direction.

12. The connector of claim 5, wherein the conductor retainer portion includes a plurality of flexible tabs configured to move outwardly upon insertion of the inner conductor of the coaxial cable such that an end of each of the plurality of flexible tabs engages the inner conductor to prevent movement of the inner conductor in the second direction.

13. The connector of claim 5, wherein the first insulating insert portion and the second insulating insert portion are configured to electrically insulate the conductor retainer portion from the coupler portion.

14. A cable connector that provides improved axial retention of a cable comprising:
a first insert portion configured to be disposed relative to a coupler portion such that the coupler portion is configured to rotate relative to the first insert portion;
a second insert portion configured to be disposed relative to the first insert portion;
a conductor retainer portion configured to be disposed relative to the first insert portion;
wherein the first insert portion is configured to engage the coupler portion so as to restrict axial movement of the first insert portion relative to the coupler portion in an axial direction of the connector;
wherein the first insert portion is configured to engage the second insert portion so as to restrict axial movement of the second insert portion relative to the first insert portion in the axial direction;
wherein the first insert portion and the second insert portion are configured to restrict axial movement of the conductor retainer portion in the axial direction; and
wherein the conductor retainer portion is configured to receive an inner conductor portion of a cable such that the inner conductor portion is free to pass through the conductor retainer portion in a first direction toward the coupler portion to a retained configuration, and is configured to restrict the inner conductor portion in the retained configuration from passing through the conductor retainer portion in a second direction that is different from the first direction so as to axially restrict movement of the cable during operation of the connector.

15. The connector of claim 14, wherein the coupler portion is electrically conductive.

16. The connector of claim 14, wherein the first insert portion includes an engagement structure configured to engage an engagement structure of the inner surface of the coupler portion.

17. The connector of claim 16, wherein the engagement structure of the first insert portion comprises a circumferential ridge, and the engagement structure of the inner surface of the coupler portion comprises an annular groove.

18. The connector of claim 14, wherein the first insert portion includes an engagement structure configured to engage an engagement structure on the radially outer surface of the second insert portion.

19. The connector of claim 18, wherein the engagement structure of the first insert portion comprises an annular groove and the engagement structure on the radially outer surface of the second insert portion is a circumferential ridge.

20. The connector of claim 14, wherein the first insert portion and the second insert portion are configured to retain the conducting retainer portion in the axial direction between a forward facing surface of the first insert portion and a rearward facing surface of the second insert portion.

21. The connector of claim 14, wherein the conductor retainer portion includes a plurality of flexible tabs, and wherein the first insert portion is configured to engage the conductor retainer portion radially outward of flexible tabs.

22. The connector of claim 14, wherein the conductor retainer portion includes a plurality of flexible tabs configured to define a central aperture having a diameter configured to receive the inner conductor portion of the coaxial cable, and the conductor retainer portion includes a plurality of radial openings configured to define the plurality of flexible tabs that allow movement of the inner conductor portion of the coaxial cable in the first direction and prevents movement of the inner conductor portion in the second direction.

23. The connector of claim 22, wherein the plurality of flexible tabs are configured to move outwardly upon insertion of the inner conductor portion of the coaxial cable such that an end of each of the plurality of flexible tabs engages the inner conductor portion to prevent movement of the inner conductor portion in the second direction.

24. The connector of claim 14, wherein the first insert portion and the second insert portion are configured to electrically insulate the conductor retainer portion from the coupler portion.

* * * * *